Figure 1:
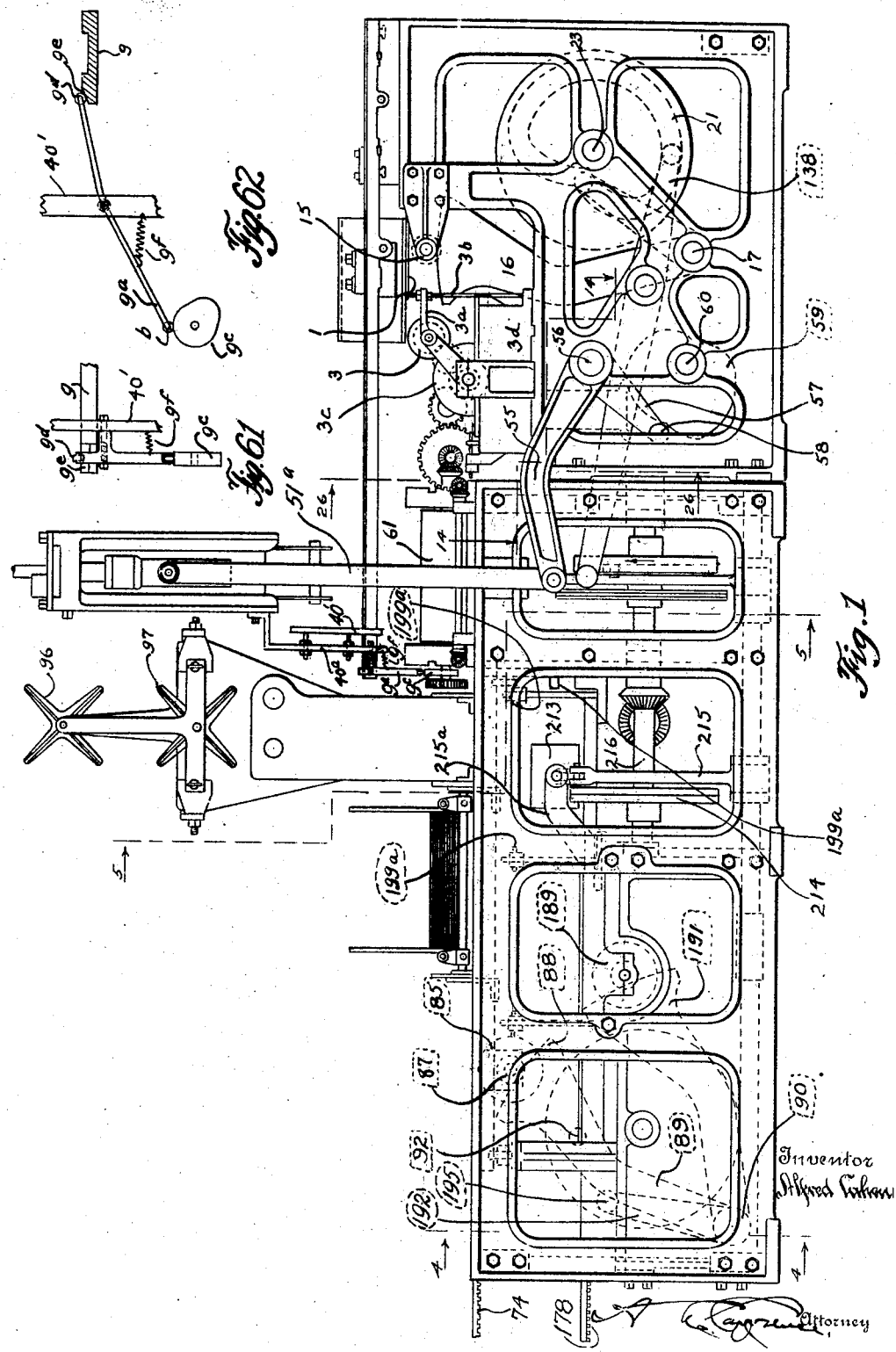

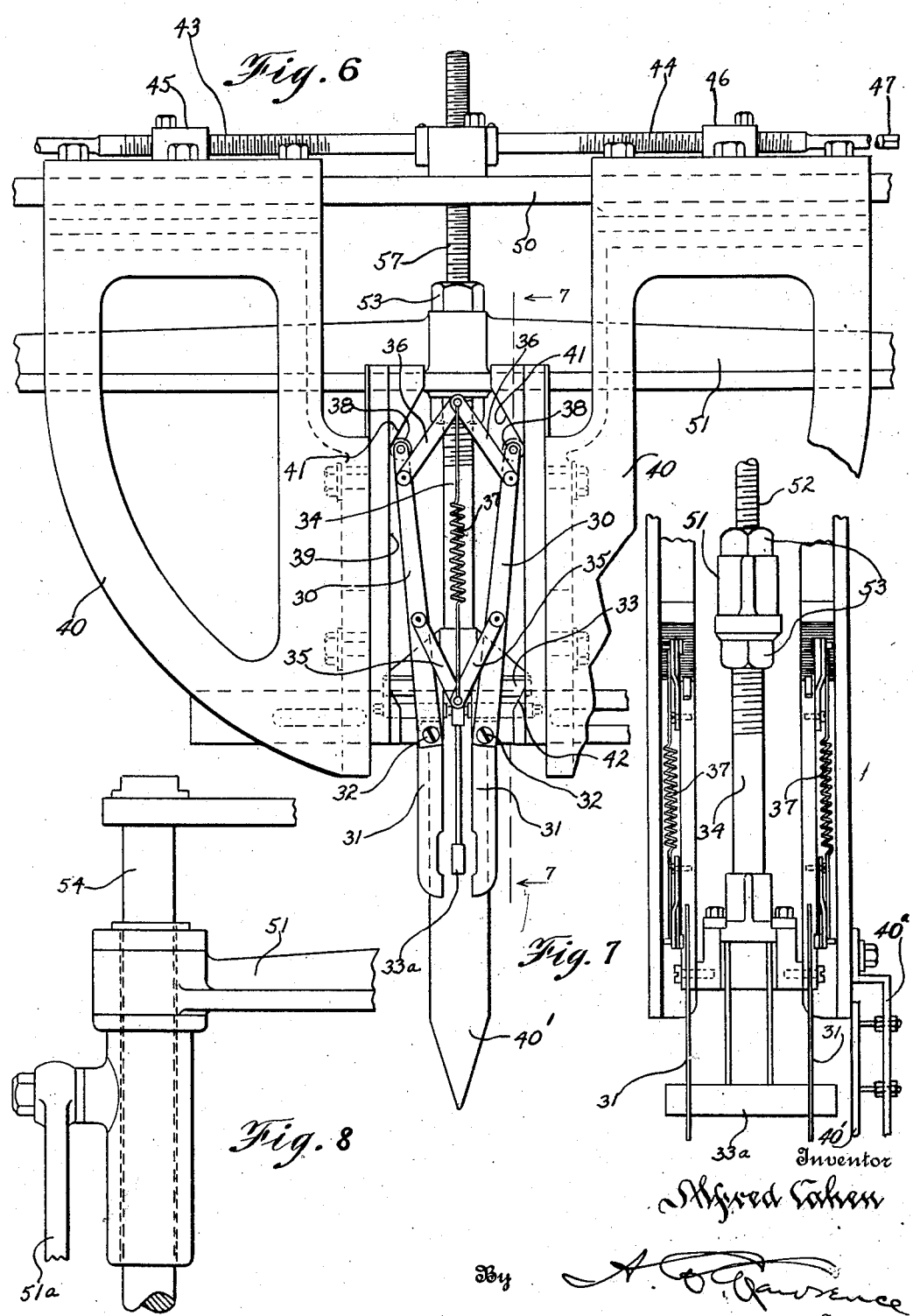

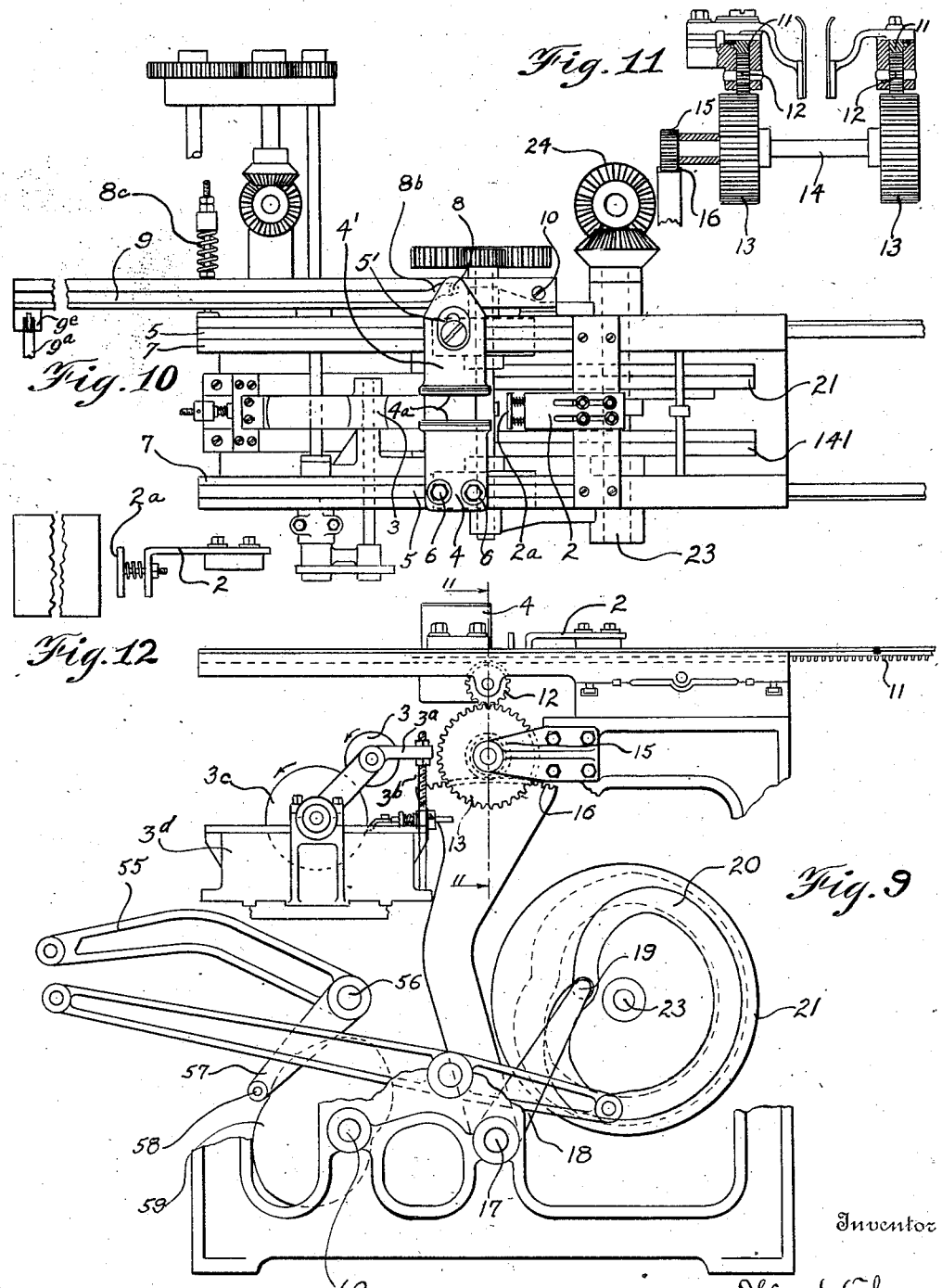

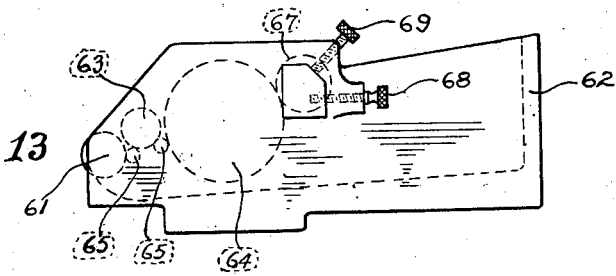
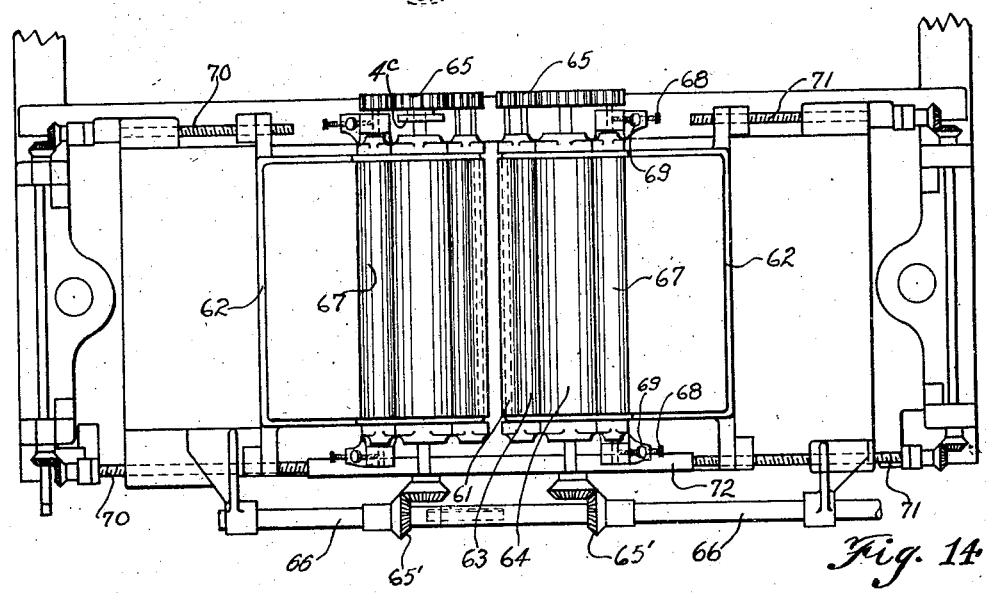
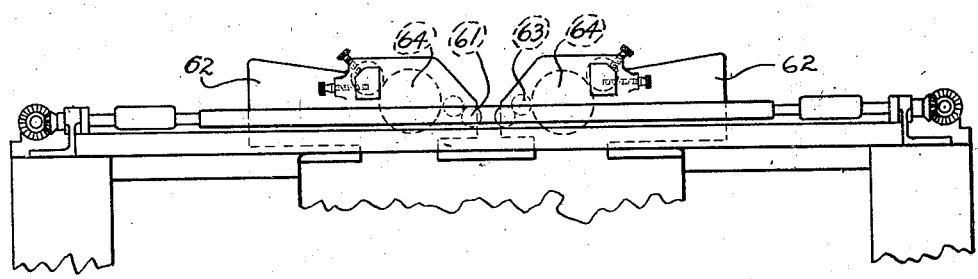

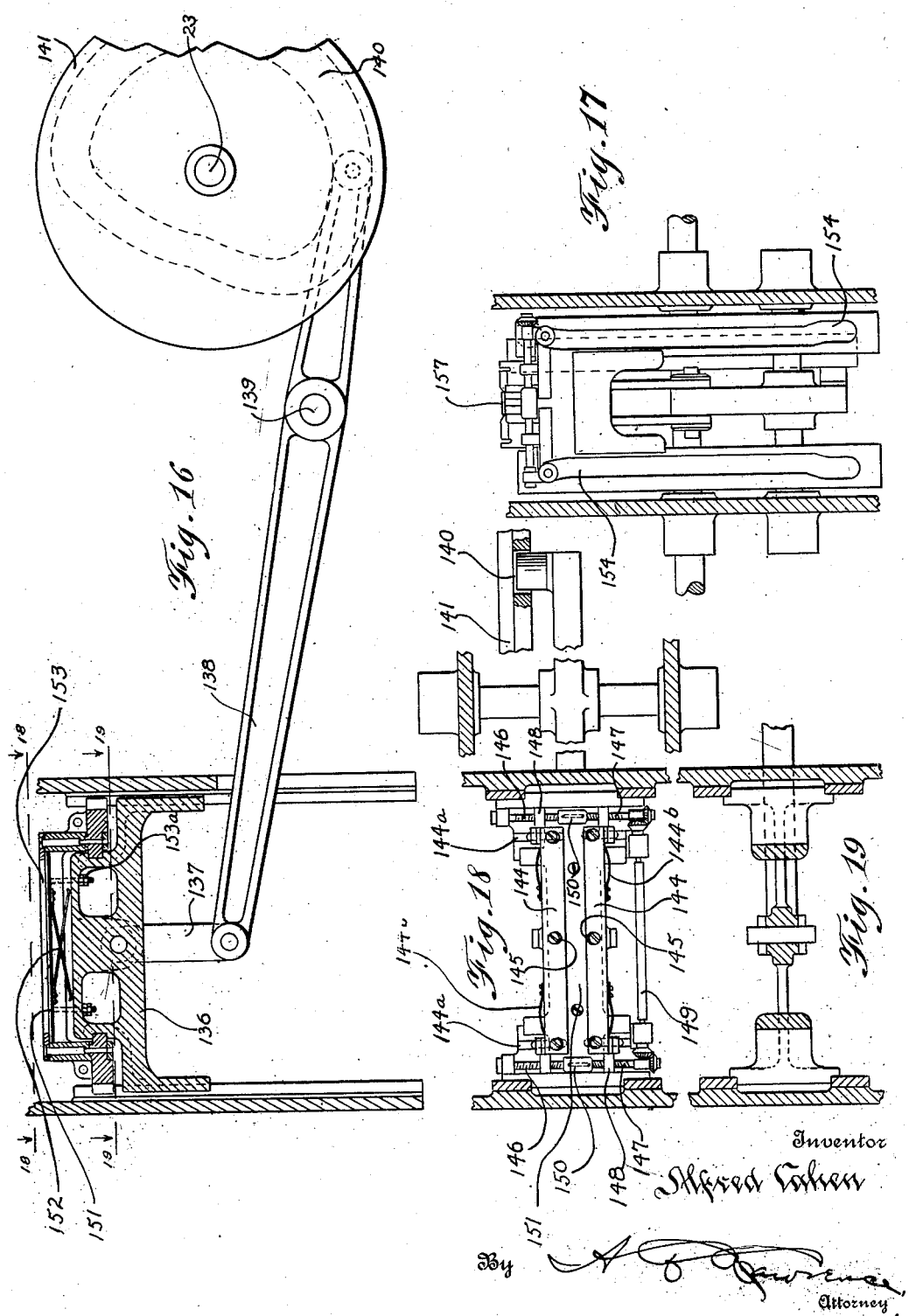

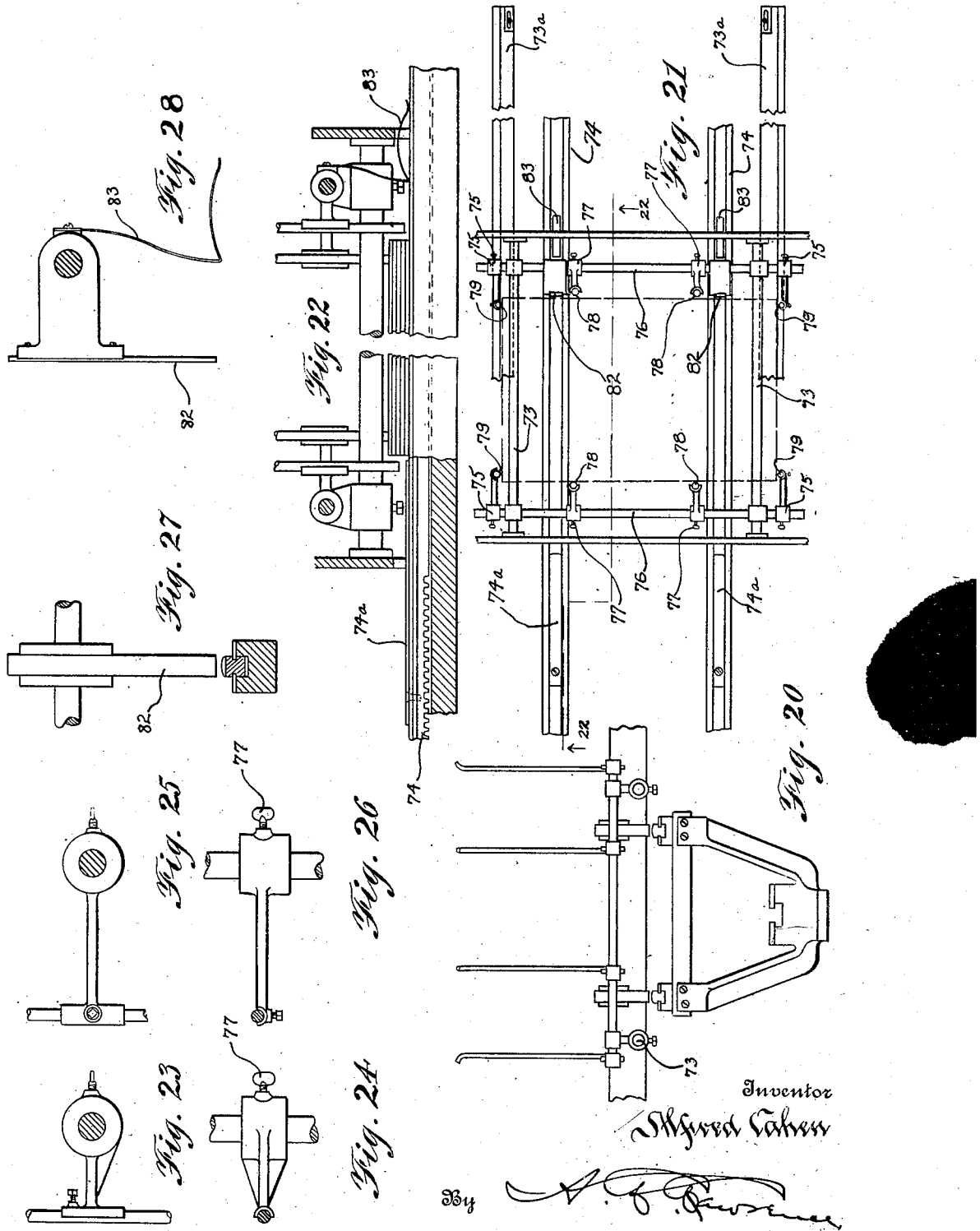

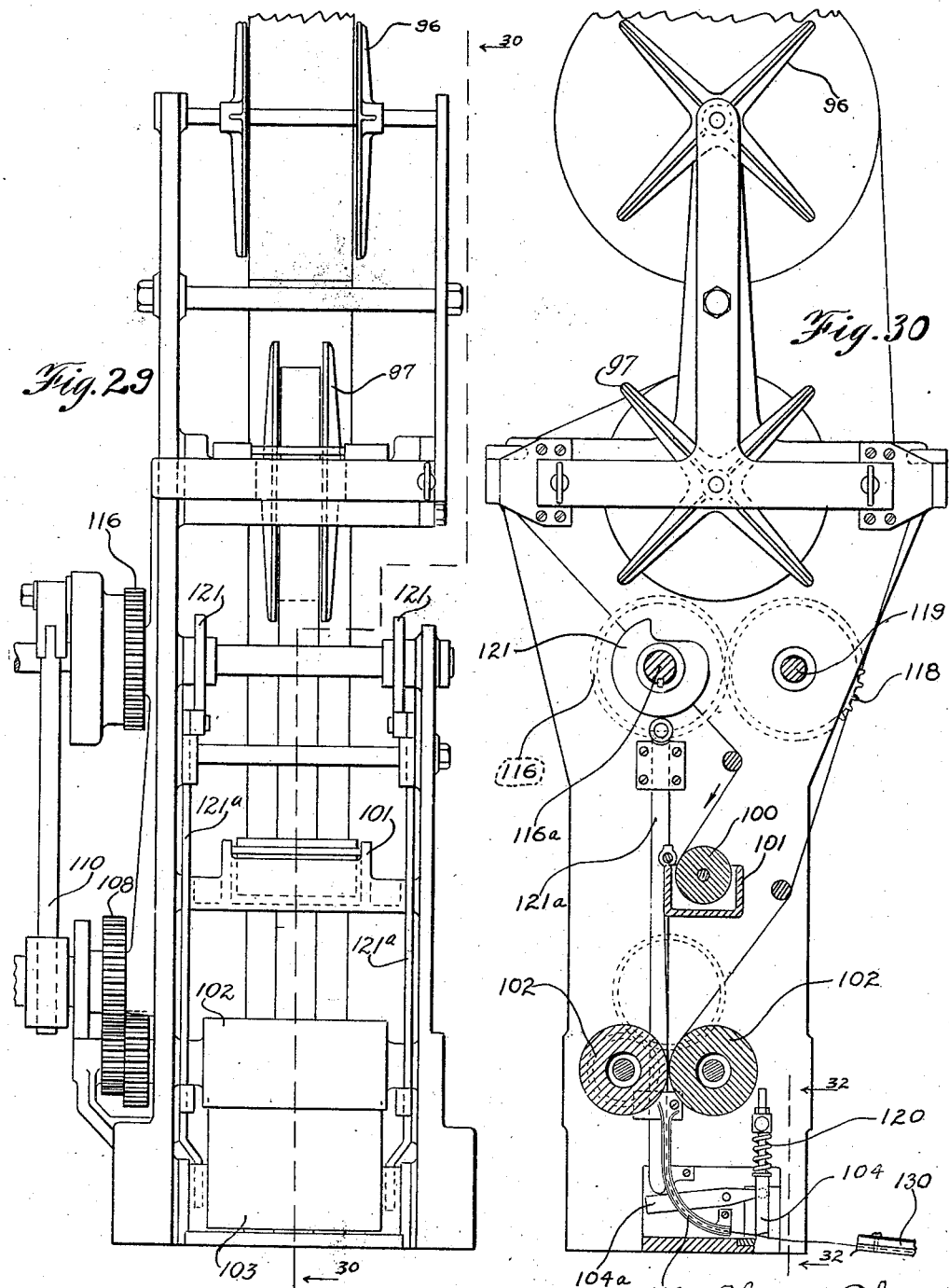

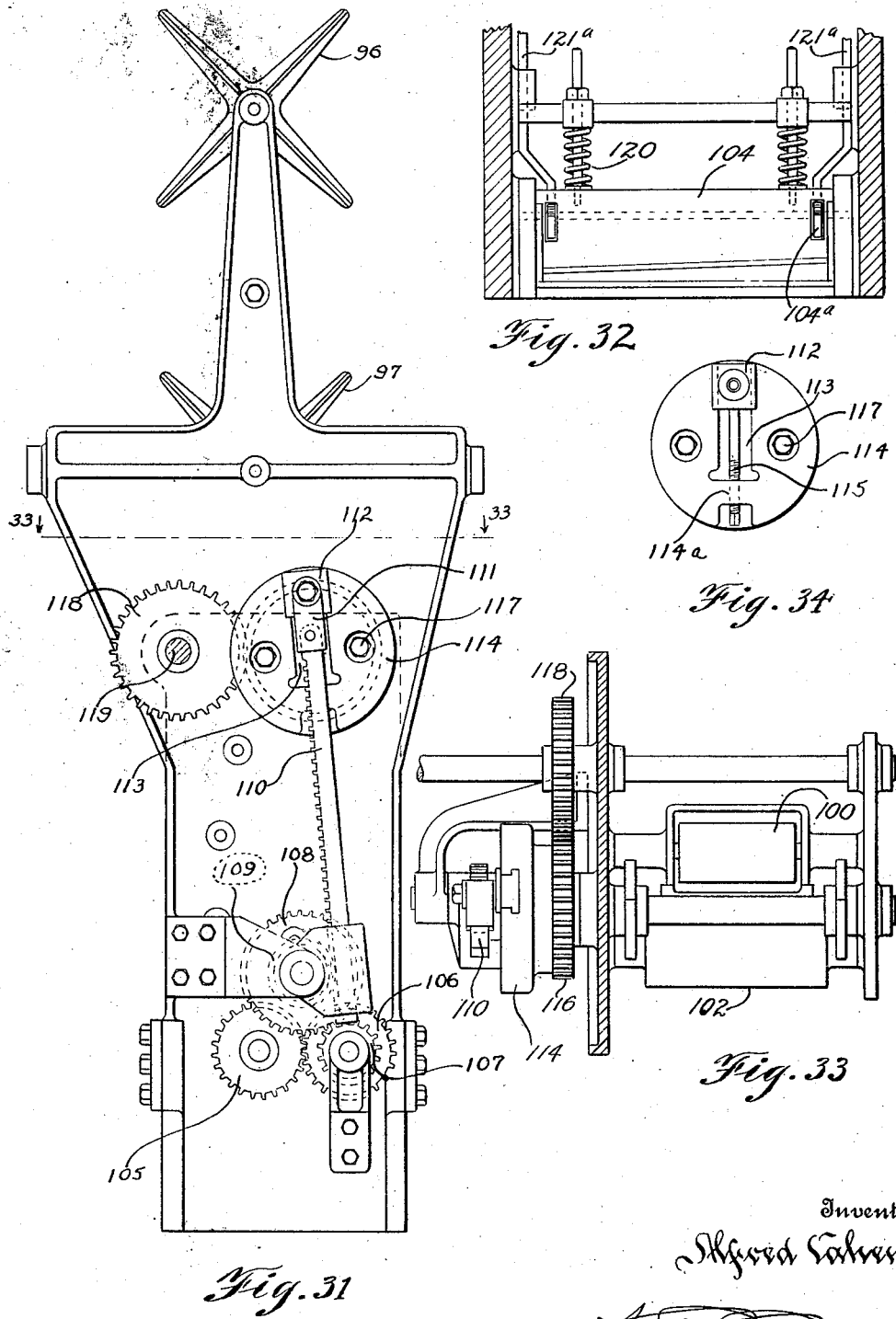

July 15, 1930.  A. CAHEN  1,770,731
BOOKBINDING MACHINE
Filed Feb. 18, 1927  20 Sheets-Sheet 13

Inventor
Alfred Cahen

By
Attorney

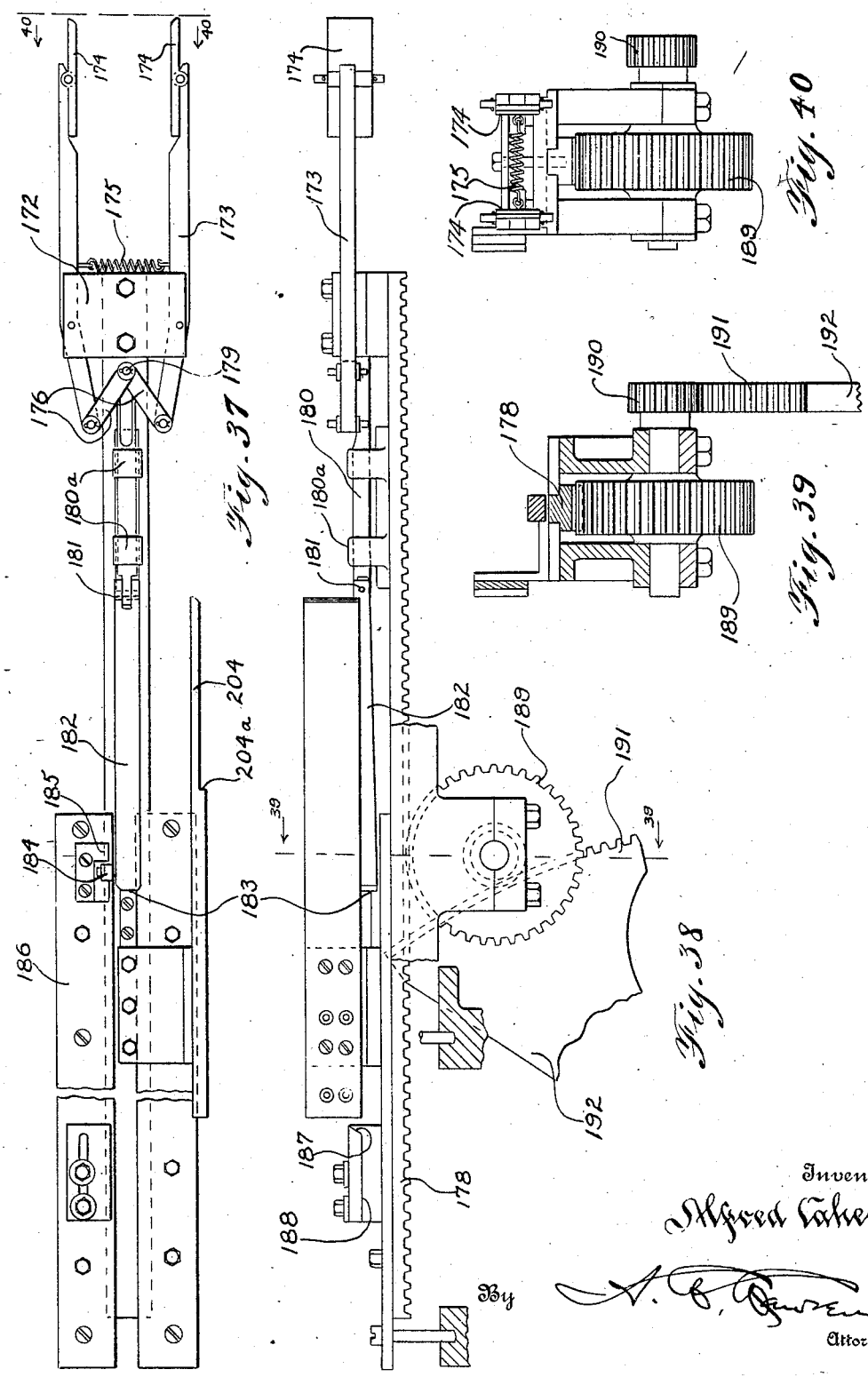

July 15, 1930.   A. CAHEN   1,770,731
BOOKBINDING MACHINE
Filed Feb. 18, 1927   20 Sheets-Sheet 15

Inventor
Alfred Cahen
By _____
Attorney

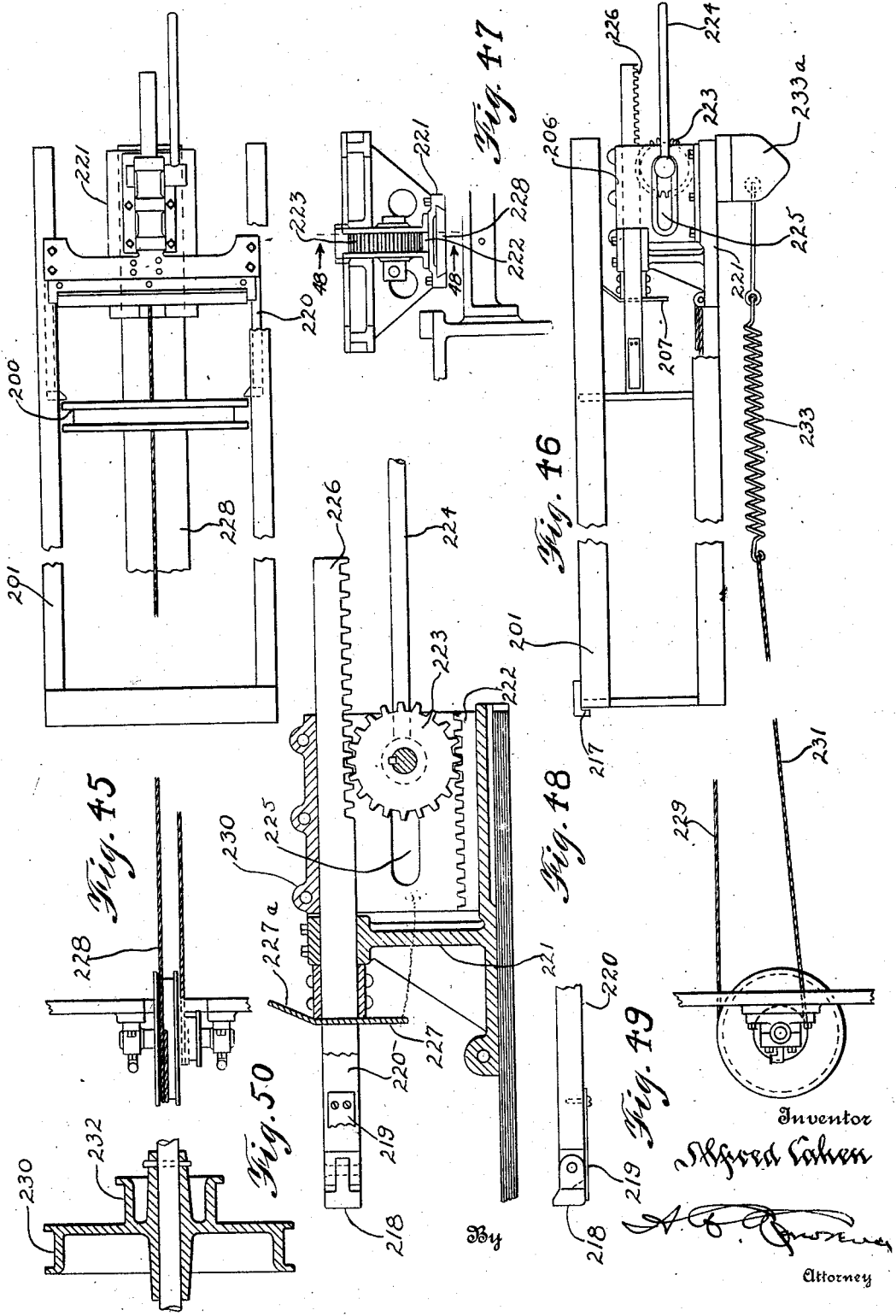

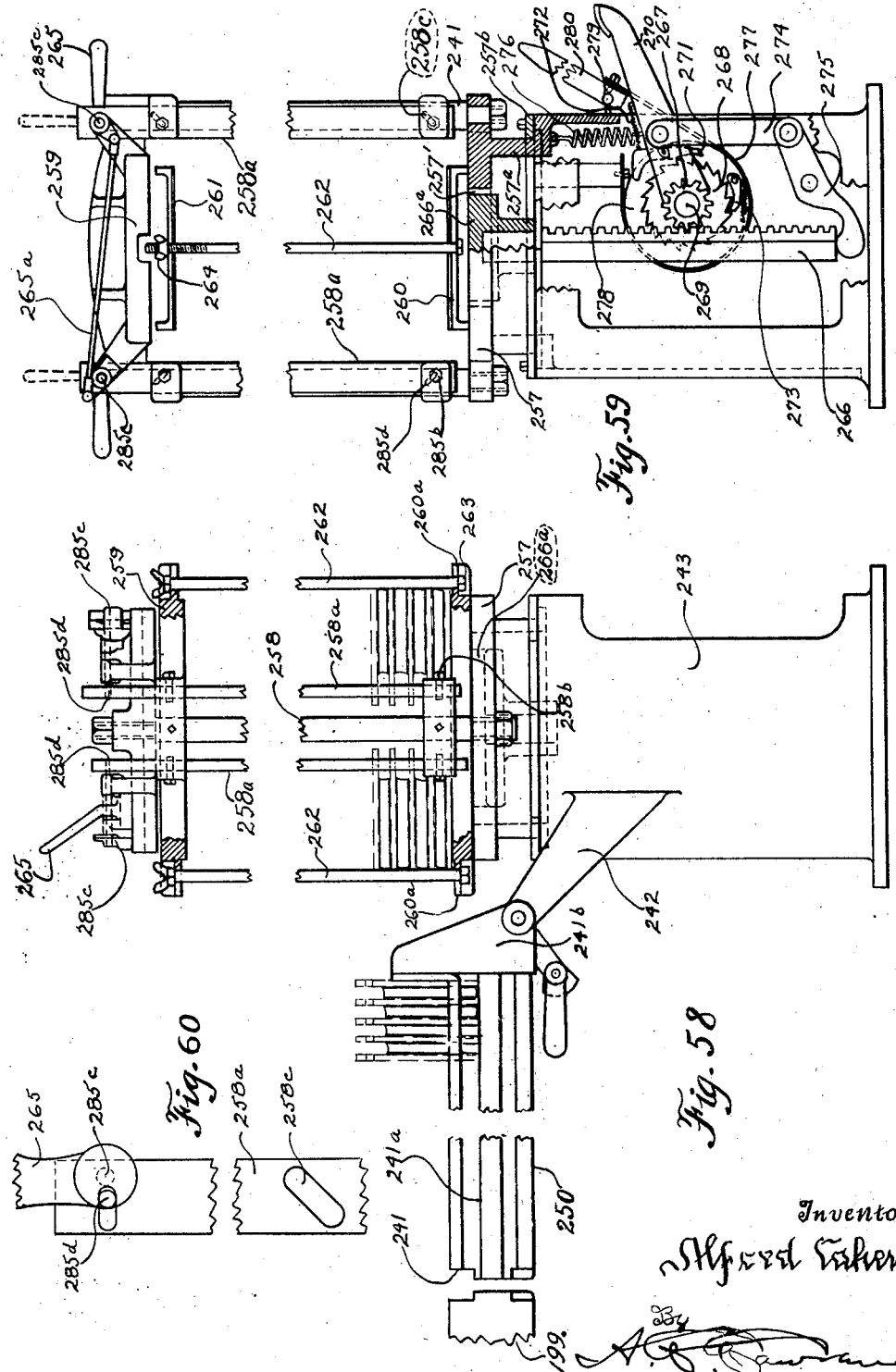

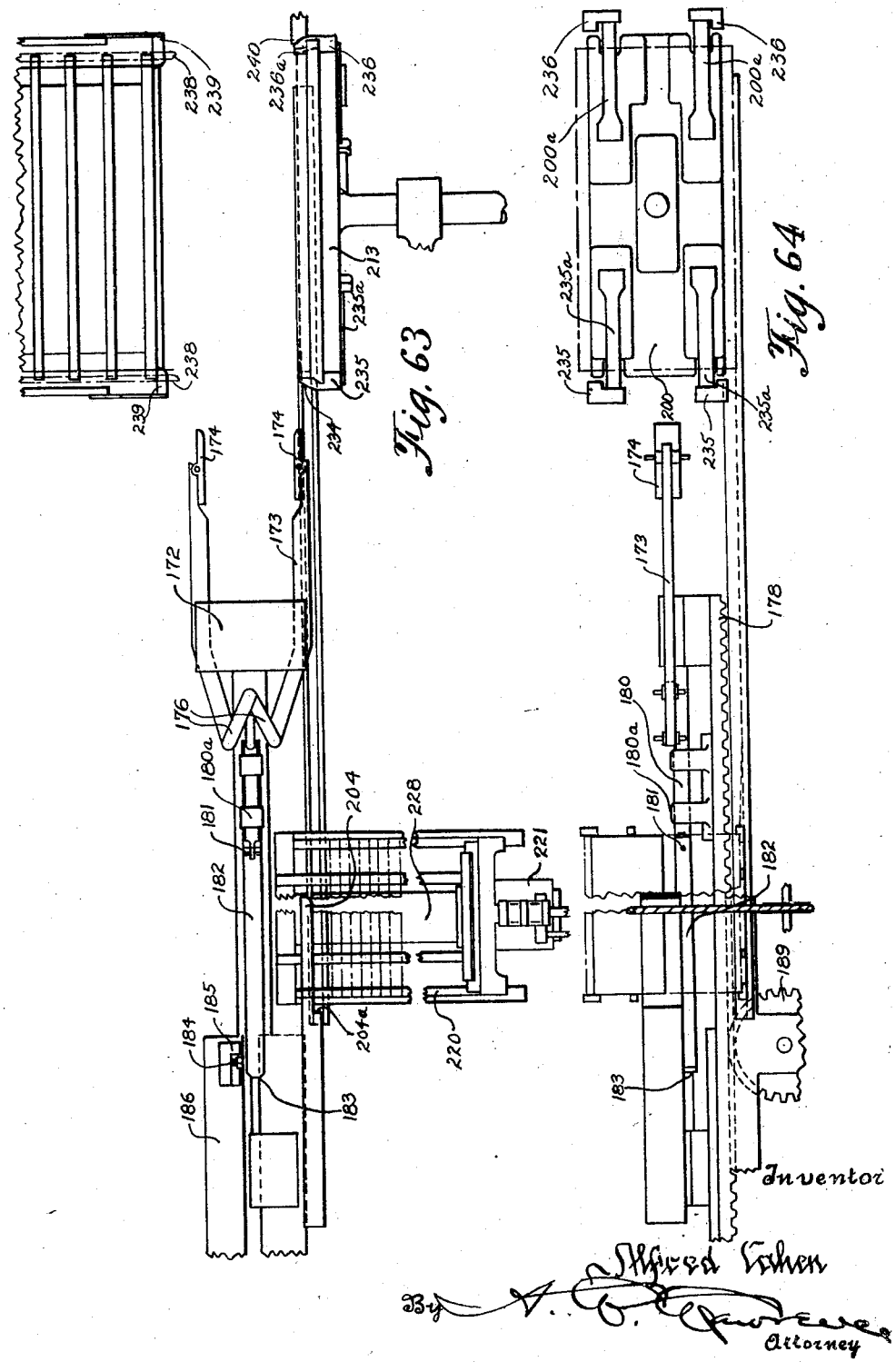

Patented July 15, 1930

1,770,731

UNITED STATES PATENT OFFICE

ALFRED CAHEN, OF CLEVELAND HEIGHTS, OHIO

BOOKBINDING MACHINE

Application filed February 18, 1927. Serial No. 169,295.

This invention relates to improvements in book-binding machines, and the general object of the present invention is to provide such a machine that is capable of increased production as well as improved quality of work.

More particularly, the objects of this invention are to provide an improved form of glue brush which will force the glue in between the back edges of the signatures or sections of books of various sizes; to provide means for automatically gluing together and cutting a predetermined length of "super" and paper and feeding the same together to the cover and book so as to serve as a reinforcement; to provide an improved means for feeding and positioning the book and cover in their progress through the machine both prior to as well as during the binding operation and the further operation of withdrawing the bound book from the machine; to provide means for shaping the back of the cover about the back of the book; to provide means for supplying especially designed plates in alternate arrangement with the bound books, said plates being adapted to form hinge joints between the back and sides of the cover when subjected to pressure which is finally applied to such a group of books and plates.

According to the present invention, the unbound books or fillers are placed by hand one at a time in the one end of the machine so as to rest upon their backs, these books are successively fed toward the center of the machine, glue is automatically applied to the back of each book, and at the same time the book covers are automatically fed one at a time from the other end of the machine and with the "super" and paper, are brought into proper position to receive the book. Paste is automatically applied to the sides of the book while being fed along the path just mentioned, and the book is then placed and secured within the cover with the "super" and paper reinforcement there between, the cover being automatically shaped about the back of the book. The bound book is then automatically carried into the path of a transversely extending chute into which it deposited and along which it is moved so as to be discharged from the machine. At the same time, plates of hard material, such as metal or hard rubber and of a particular design are automatically fed and placed between the books in the delivery chute, from which the books and plates are removed in assembled groups for the pressing operation, such pressure operation at the same time causing the plates to impress hinge joints in the form of grooves between the back and sides of each book cover. The entire binding operation, as above outlined, is performed by means of the same motive power and the several mechanisms for producing the several movements and operations are all properly timed with respect to each other. The several mechanisms are also adjustable so as to accommodate books of different sizes.

Figure 2:
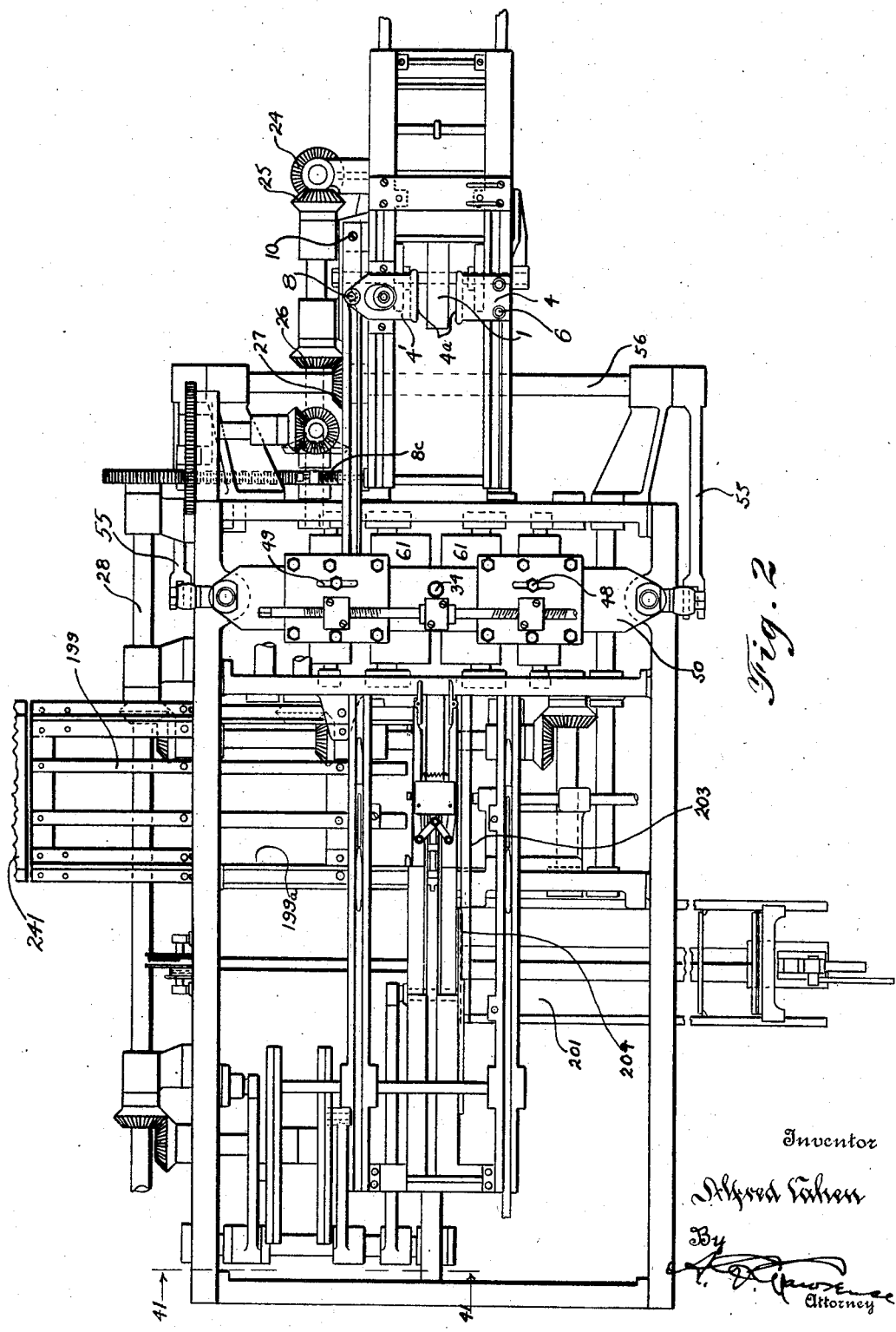
Figure 3:
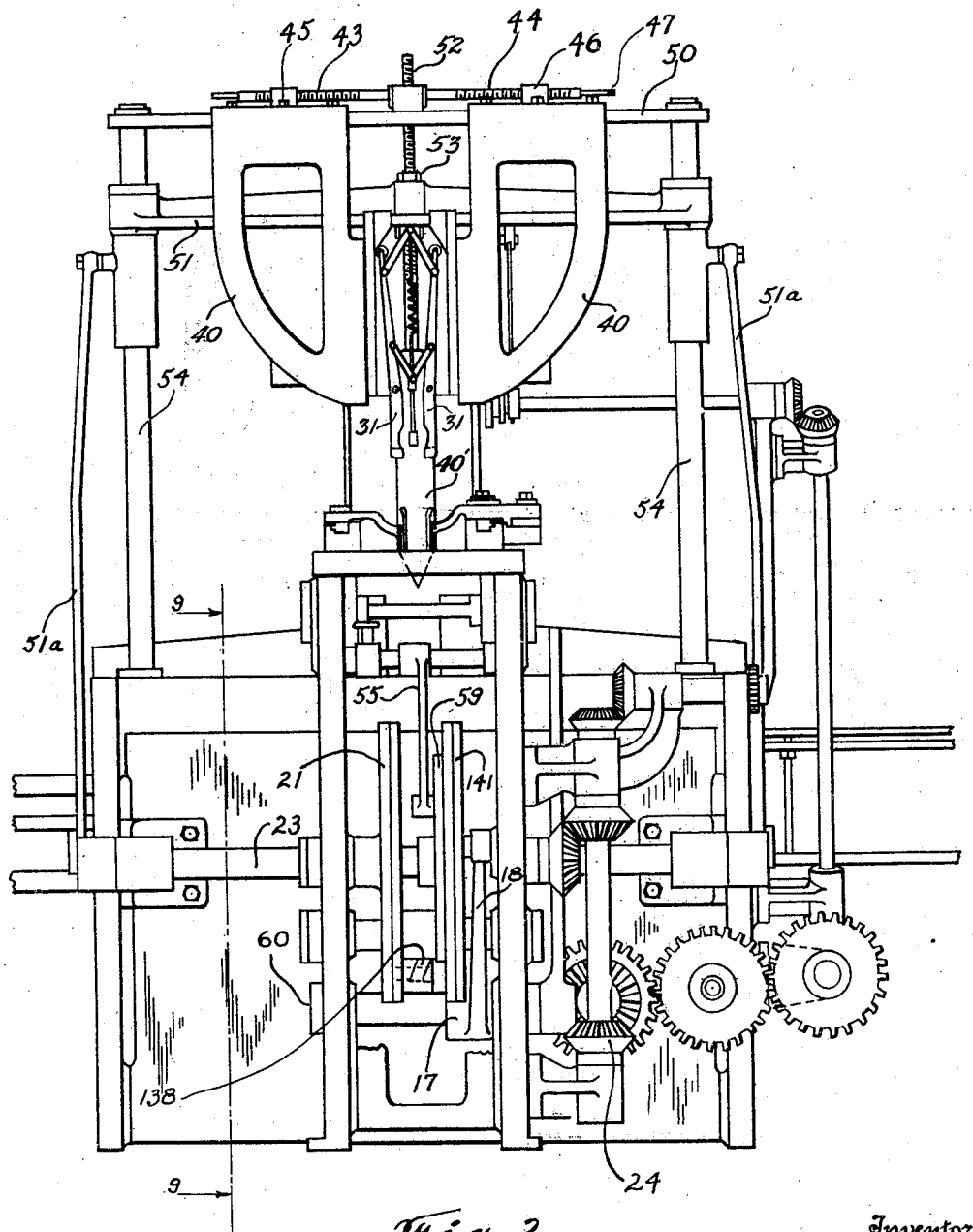
Figure 4:
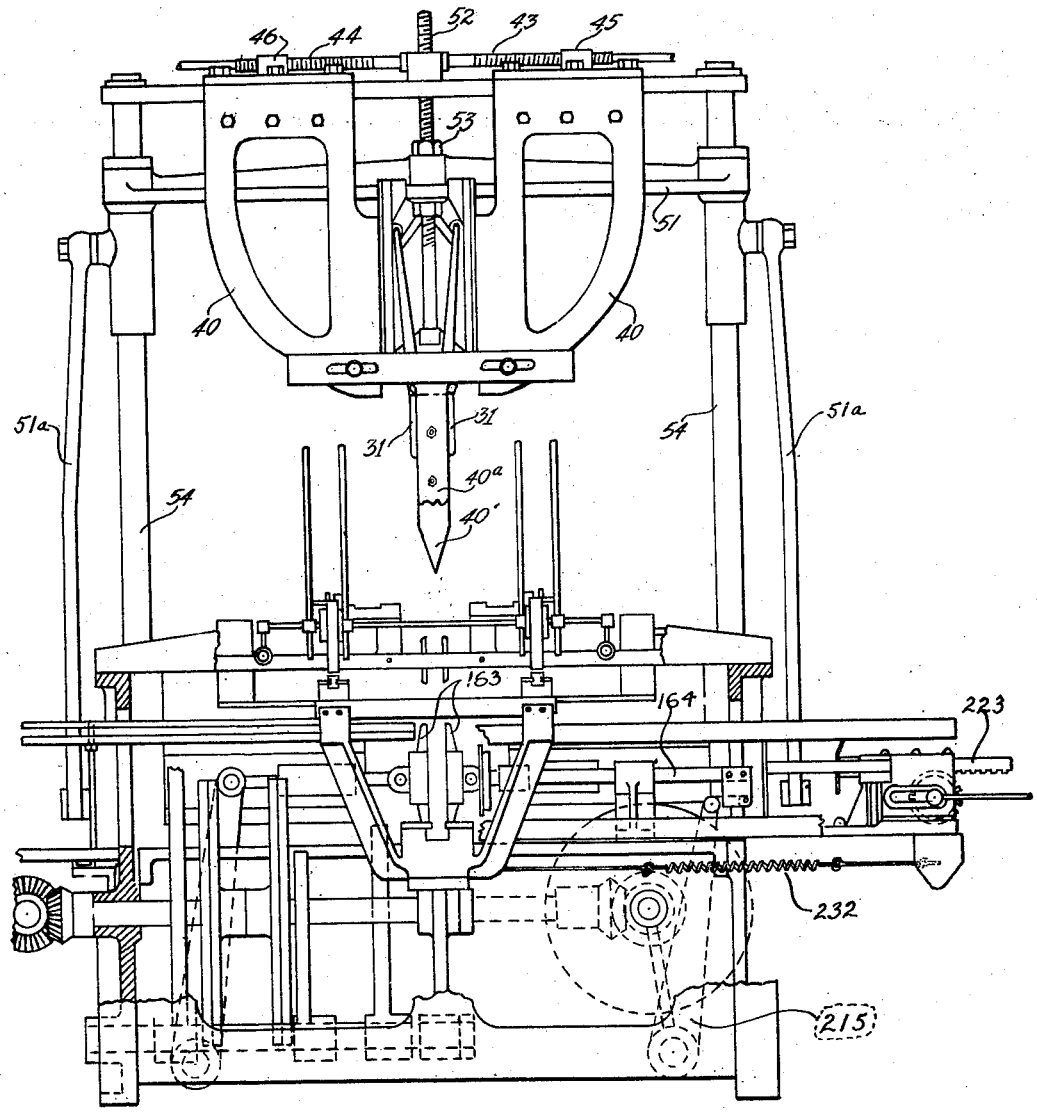
Figure 5:
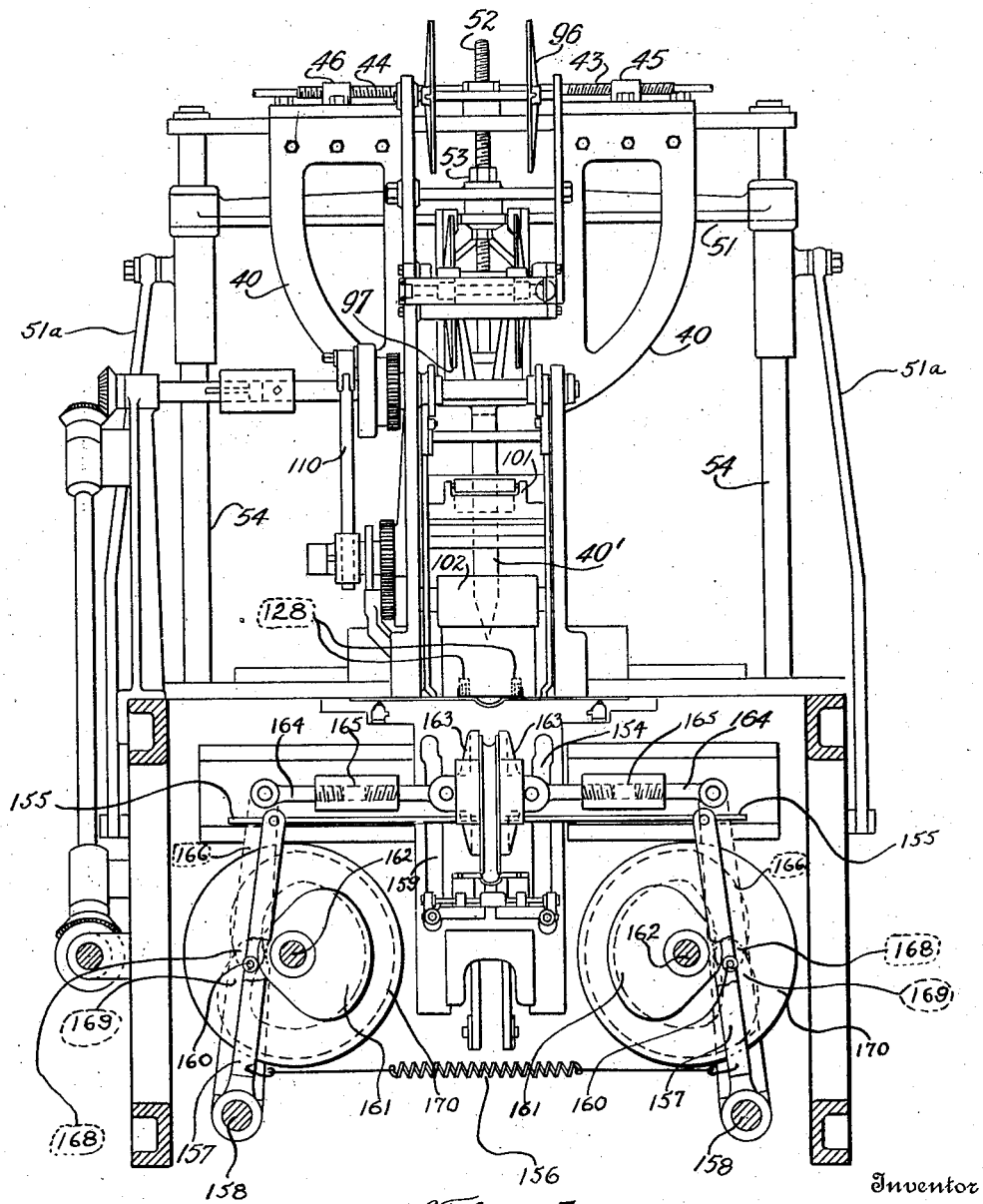
Figure 35:
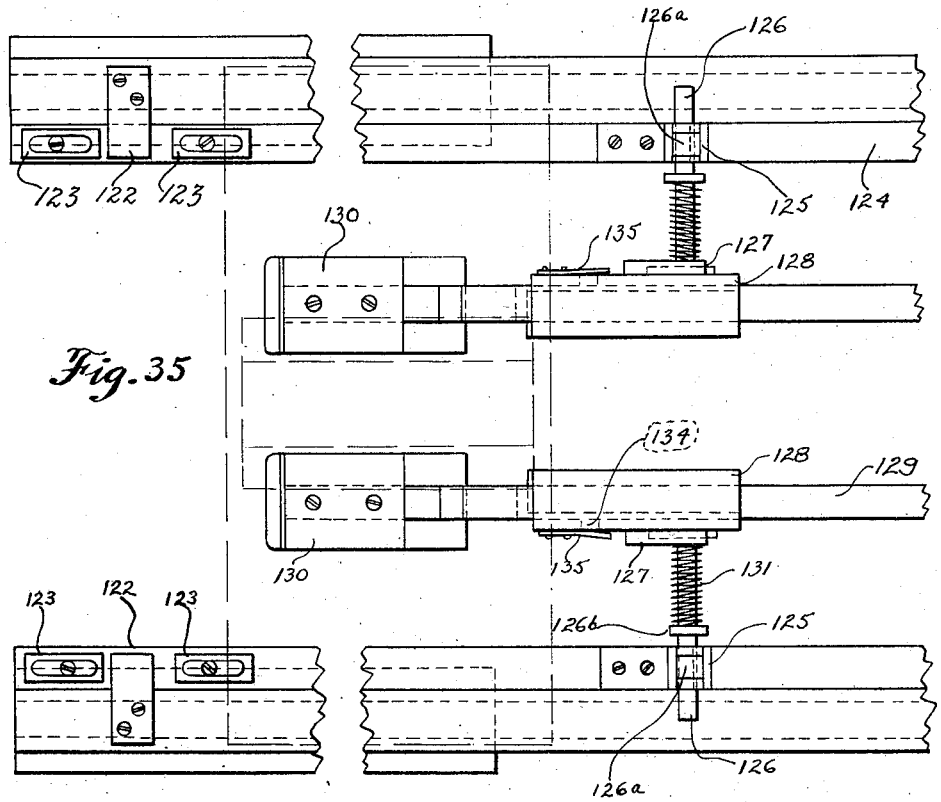
Figure 36:
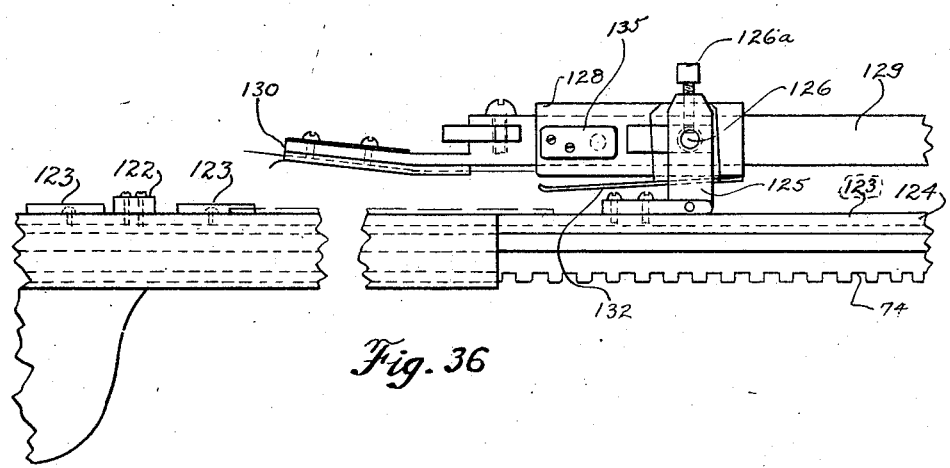
Figure 43:
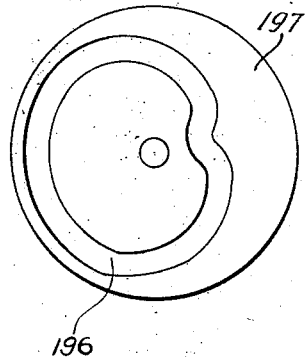
Figure 42:
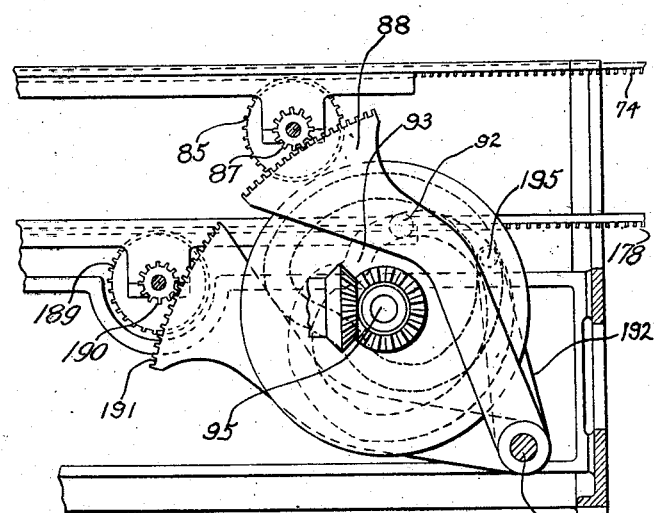
Figures 41, 44:
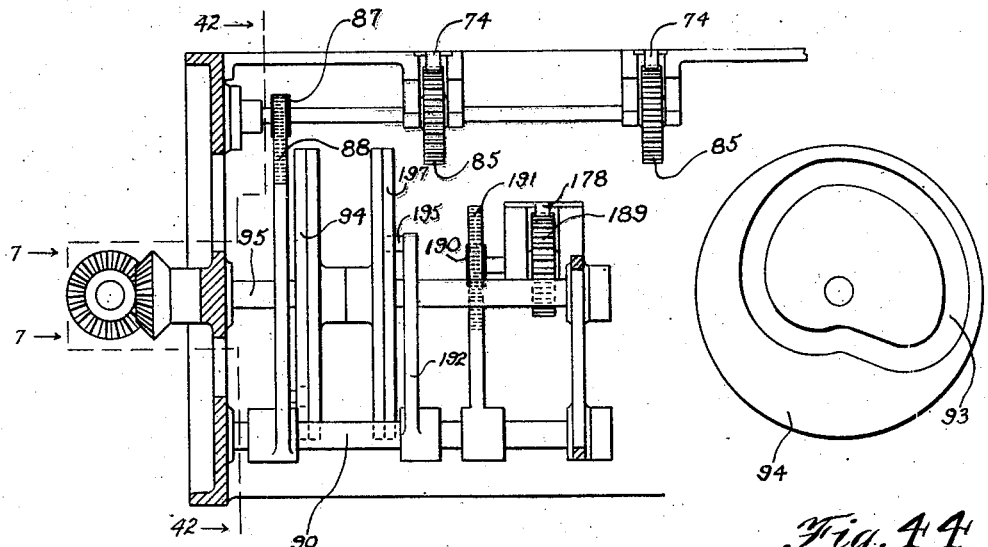
Figure 51:
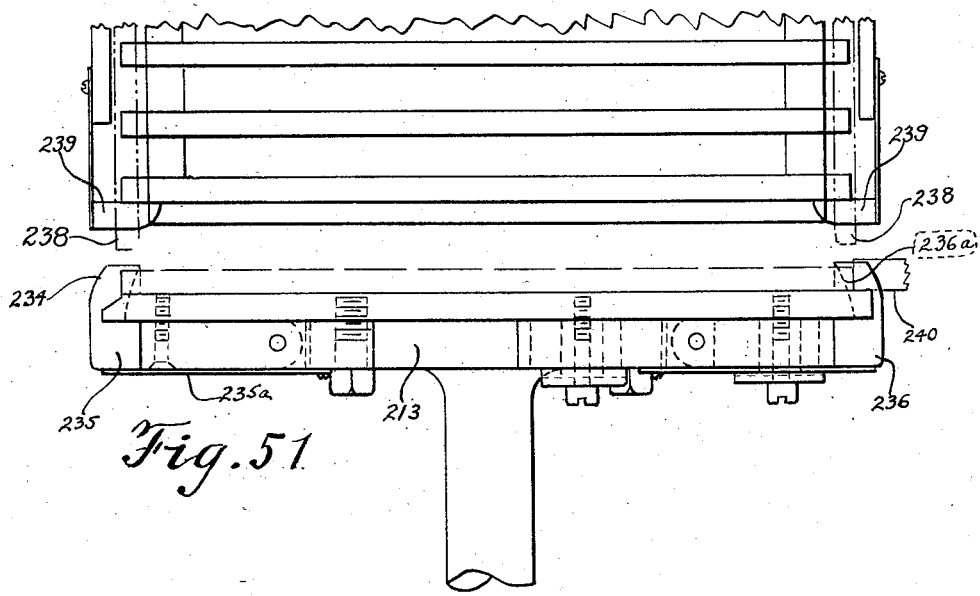
Figure 52:
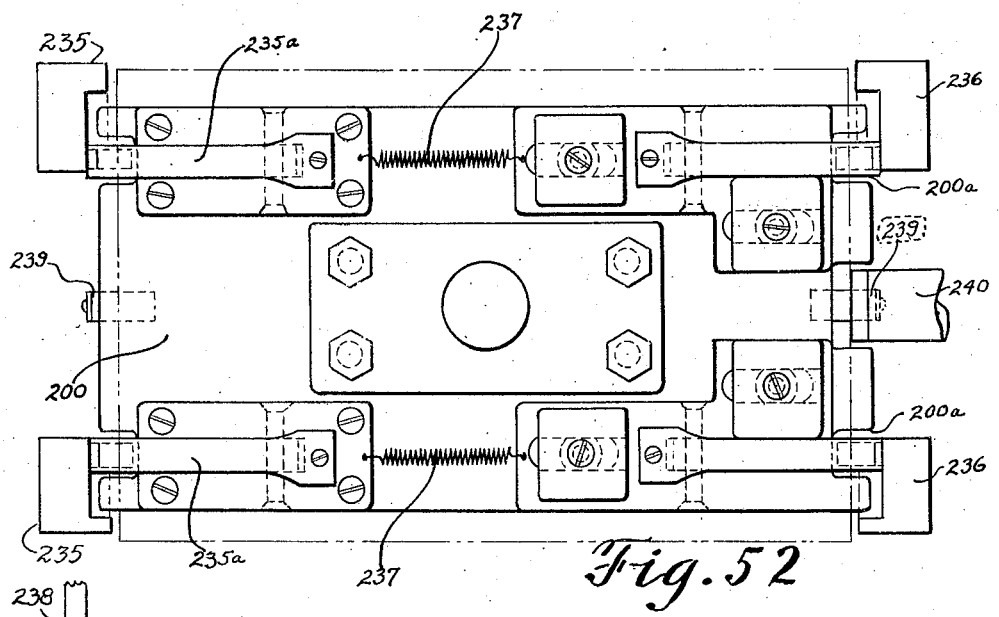
Figure 53:
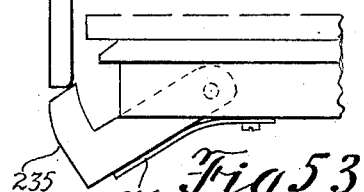
Figure 54:
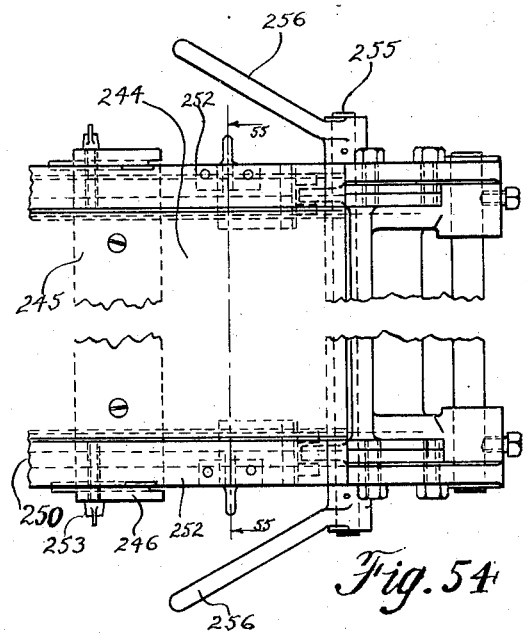
Figure 55:
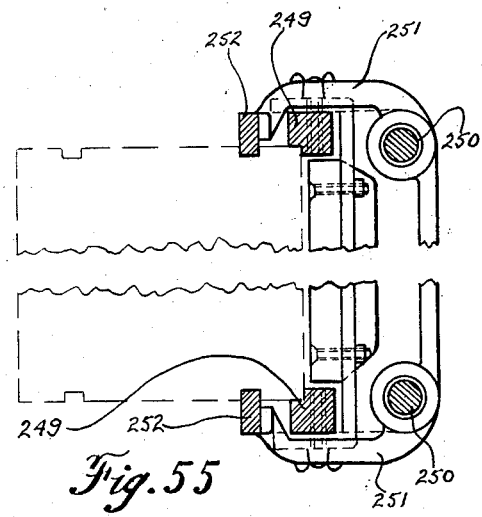
Figure 56:
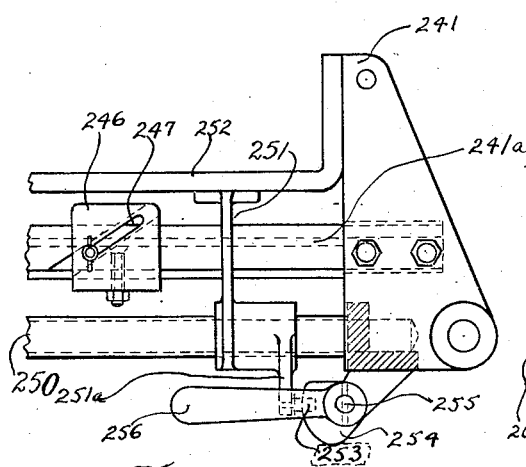
Figure 57:
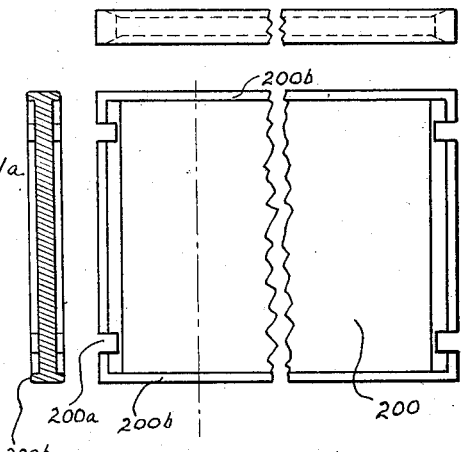

Fig. 1 is a side elevation of the machine with parts omitted; Fig. 2 is a top plan view with parts omitted; Fig. 3 is a front end elevation with parts omitted; Fig. 4 is a cross sectional view taken approximately on line 4—4 of Fig. 1 with parts omitted; Fig. 5 is a cross sectional view taken on line 5—5 of Fig. 1; Fig. 6 is a front elevation of the mechanism for feeding the unbound book through the pasting mechanism and for simultaneously shaping the back of the cover while being fed into the back gripper, this feeding mechanism being herein referred to as the top book gripper; Fig. 7 is a detail sectional view taken on line 7—7 of Fig. 6; Fig. 8 is a partial elevation of the yoke of the top book gripper; Fig. 9 is a partial view taken approximately on line 9—9 of Fig. 3; Fig. 10 is a top plan view of the mechanism shown in Fig. 9; Fig. 11 is a sectional view taken on line 11—11 of Fig. 9; Fig. 12 is a detail view of the spring bumper for the book; Fig. 13 is an end elevation of the pasting means; Fig. 14 is a plan view of the pasting means; Fig. 15 is a side view of the pasting means; Fig. 16 is a sectional view of the back gripping mechanism; Fig. 17 is an elevation of the same; Fig. 18 is a sectional view taken on line 18—18 of Fig. 16; Fig. 19 is a sectional view taken on line 19—19 of Fig. 16; Fig. 20 is a partial end elevation of the cover rack; Fig. 21 is a partial plan view of the cover rack; Fig. 22 is an enlarged sectional view taken on line 22—22 of Fig. 21; Figs. 23 and 24 are end and top views, respectively, of one of the brackets for the cover rack; Figs. 25 and 26 are end and top views, respectively, of another bracket for the cover rack; Figs. 27 and 28 are rear and side views, respectively, of the cover guide element; Fig. 29 is an end elevation of the "super" and paper feed mechanism; Fig. 30 is a sectional view taken on line 30—30 of Fig. 29; Fig. 31 is a side elevation of the "super" and paper feed mechanism. Fig. 32 is a sectional view taken on line 32—32 of Fig. 30; Fig. 33 is a sectional view taken on line 33—33 of Fig. 29; Fig. 34 is a detail view of the adjusting means; Fig. 35 is a partial plan view of another part of the "super" and paper feed mechanism; Fig. 36 is a side elevation of the same; Fig. 37 is a plan view of the finished book gripper; Fig. 38 is a side elevation of the same; Fig. 39 is a sectional view taken on line 39—39 of Fig. 38; Fig. 40 is a detail view taken on line 40—40 of Fig. 37; Fig. 41 is a partial view taken on section line 41—41 of Fig. 2; Fig. 42 is a sectional view taken on line 42—42 of Fig. 41; Fig. 43 is a detail view of the cam for operation of the plate and book pusher mechanism; Fig. 44 is a detail view of the cam for operation of the cover feeding mechanism; Fig. 45 is a plan view of the plate magazine and supply means therefor; Fig. 46 is a side elevation of the same; Fig. 47 is an end elevation of the same; Fig. 48 is an enlarged sectional view taken on line 48—48 of Fig. 47; Fig. 49 is a plan view of the latch; Fig. 50 is a sectional view of the pulley; Fig. 51 is a detail plan view of the plate pusher mechanism; Fig. 52 is a rear view of the same; Fig. 53 is a partial view showing the manner of operation of the latch members on the plate pusher; Fig. 54 is a plan view of the rack for receiving the bound books from the delivery chute; Fig. 55 is a sectional view of the same taken on line 55—55 of Fig. 54; Fig. 56 is a side elevation of the same; Fig. 57 is a view of a plate; Fig. 58 is a side elevation of the book press and rack which are mounted upon the same base; Fig. 59 is an elevation of the same press taken at ninety degrees to Fig. 58 and with parts broken away; Fig. 60 is a fragmentary detail view; Fig. 61 is an enlarged detail elevation of the means for automatically releasing the first book; Fig. 62 is an elevation, taken at ninety degrees, of the parts shown in Fig. 61; Fig. 63 is a plan view illustrating the relationship of plate magazine, finished book-gripper, and delivery chute; and Fig. 64 is a view in elevation of the same parts illustrated in Fig. 63.

The back of the unbound book is adapted to be placed upon the rest or support 1, and the adjustable gauge or stop 2 with its spring-pressed foot $2^a$ against which the rear end of the book abuts, is so set for a given size of book that the front end of the book is just beyond the axis of the glue brush 3, so that the glue will be applied to only the back of the book as it is passed over the brush. The brush has a concave surface, as shown in the drawing, and is rotated in a counter-clockwise direction, as viewed in Fig. 9. The brush is mounted upon the adjustable bracket $3^a$ which is secured in set position by means of nuts on threaded rod $3^b$ which extends through the free end of the bracket. The aluminum roll $3^c$, which rotates in the same direction as the brush, feeds the glue from the container $3^d$ to the brush. A hot water jacket about the glue container keeps the glue at the proper temperature so as to maintain the proper uniform degree of viscosity.

The means for feeding the book from this position to the centre of the machine comprises the first book-carrier comprising plates 4, 4' which are disposed on opposite sides of the path of the book. The plate 4 is adjustably mounted upon its carriage rail 5, by means of the screw and slot 6, this rail having sliding engagement in the fixed track 7. The plate 4' is provided with a pin 8 at its rear end for engagement in the slot of the slotted guide bar 9 for the purpose of controlling the closing and opening movement of the plate 4' in the gripping of the book, this slot having a cam portion $8^b$ for the opening movement. The pin and slot connection 5' between this plate 4' and its carriage rail permits such operation. The bar 9 is secured at only its one end 10 and its other free end portion is engaged by spring $8^c$ which ensures proper inward gripping movement and hence gripping engagement of the corresponding gripper member 4'. The book, when engaged by the plates 4, 4', is carried thereby over the glue brush to the center of the machine where it is picked up by the top book-gripper for conveying the book down past the pasting means, as will be described below. The plates 4, 4' are provided with faces $4^a$ of bronze or other metal. As soon as the book is gripped by the top gripper, it is automatically released from the jaws 4, 4', the jaw 4' being momentarily opened by means of the mechanism illustrated in Figs. 61 and 62. Rock arm $9^a$ is mounted on a bracket, to be hereinafter referred to, and has a roller $9^b$ on one end and for engagement by eccentric $9^c$, while the roller $9^d$ at its other end is adapted to engage the cam $9^e$ provided on the end of bar 9 so as to move the same outwardly about its pivot. Eccentric $9^c$ is mounted on the shaft of roller 61, and spring $9^f$ holds roller $9^b$ against the eccentric. The bar is in release position for only a comparatively short time and is returned to its normal position by spring $8^c$.

The carriage rails 5 are reciprocated by means of racks 11 which are operated by pinions 12 which in turn are operated by gears 13 on shaft 14. This shaft 14 carries pinion 15 which is operated first in one direction and then the other by the gear segment 16 which is mounted upon the rock shaft 17. Upon this shaft 17 there is carried the arm 18 with its roller 19 which has engagement in the closed cam slot 20 in the disk 21. The cam disk 21 is fixed upon the shaft which is rotated through the pinions 24, 25, 26, 27 and other gears from the main drive shaft 28 of the motor not here indicated.

The unbound book, upon being carried by the horizontally reciprocating plates, 4, 4' to a position directly beneath the top book gripper, is adapted to be gripped at its upper edge portion between the two oppositely disposed sets of grippers which constitute the top book gripper mechanism. Each of these grippers comprises the angularly arranged upper and lower parts 30 and 31 secured together by means of rivets. The screws 32 serve as a pivotal mounting for the grippers on the block 33 which is carried by the lower end of the vertically movable post 34. The opposite grippers of the two sets are connected by toggle links 35 and 36, which in turn are connected by springs 37 so as to normally force the rollers 38 on the upper ends of the upper portions 30 outwardly into engagement with the guide-ways 39 of the frame members 40 and thereby cause the grippers to engage the book. Cams 41 and 42 at the upper and lower ends of the guide-ways cause the fingers to open. The arm 33ª depends from the block 33 and occupies such position that it will engage the edge of the book as it is clamped by the grippers. This serves as a means of maintaining the book in stiff condition during this step of operation.

The book stop 40' serves to stop the book in position directly under the top book gripper, and the spring backing 2ª ensures effective contact of the book with the stop without buckling. The stop 40' is mounted upon the bracket 40ª which is adjustable on the frame members 40 by means of the screw and slot connections shown. The frame members 40 are adapted for lateral adjustment by means of the oppositely threaded portions 43, 44 and the corresponding fixed nut members 45, 46 on the frame members. The threaded portions 43, 44 are formed on the same rod which has one end squared, as at 47, so as to facilitate adjustment. The screw bolts 48 and slots 49 afford a means by which the frame members 40 can be adjusted along their transverse support 50 and by which they can be set in adjusted position. The post 34 is adjustably mounted in the cross-head 51 by means of the threaded portion 52 and lock nuts 53. The cross-head 51 is slidably mounted at its ends so as to move up and down the upright guide posts 54 which are mounted in the frame of the machine structure. The cross-head is operatively connected to the upper ends of lever arms 51ª, the lower ends of which are pivotally connected to the rock arms 55 which form one part of bell-crank lever mounted on the axis 56. The other arm 57 of the lever carries roller 58 at its free end and engages the cam 59 for operation of the parts just described. The cam 59 is carried by shaft 60 which is operated in proper time relation by the main drive shaft through the train of connections shown on the drawing. These parts are so constructed and arranged that the top book gripper, in open position, will automatically descend and close upon and firmly grip the upper portion of the book, whereupon the first book carrier just prior to receding, opens so as to release the book which is then held by the top gripper. The book is then carried down past the pasting rolls to a position above and in proper registry with a book cover which has in the meantime been automatically fed to position above the back gripper, whereupon the cover is automatically shaped about the back of the book by engagement of the back gripper.

During the pasting operation, above referred to, the book is moved down so as to cause its sides to wipe past the pasting rolls 61 which are the forward rollers of oppositely disposed series of companion rollers mounted just above the paste-containing pans 62. It is to be understood that the movement of the top book-gripper is sufficient to ensure books of different sizes being passed in contact with the pasting rollers in the proper manner. Rollers 61 are rotated with the train of rollers 63 and 64, which are driven though suitable gear connections and pinions indicated in a general way at 65 and 65'. All of the rollers, in each case, rotate in a counter clockwise direction, as viewed in Fig. 13; or, in other words, in the direction of the downward movement of the book as it is passed between these rollers, and their train of operating gears is devised accordingly. Excess rollers 67 are also provided. The excess rollers are adjustable by means of the screws 68 which extend horizontally while the locking screws 69 extend diagonally, as seen in Fig. 13, these screws engaging the bearings of the rollers. By means of screws 68, the rollers 67 can be adjusted forwardly and backwardly. The screws 69 serve as set screws and also as a means of bracing the rollers 67 and their bearings. All the rollers are mounted in the side walls of the paste pans and there is sufficient play allowed for the bearings of rollers 67 to permit the adjustment referred to and these pans together with their particular rollers are adjustable as units towards and from each other so as to vary the space between the opposite rollers 61, according to the particular thickness of book that is being bound at a given time. The telescoping shaft sections 66 permit the adjustment just referred to. The means for simultaneously adjusting the paste pans towards or from each other comprises the two pairs of screws 70, 71 which have threaded engagement with arms on the pans so as to operate in the manner of screw and nut. The pair of screws 70 are adjustable by means of the operating shaft which has bevel gear connection therewith; and one of the screws 70 is operatively connected to one of the screws 71 by means of the bar 72.

As above stated, while the book is being advanced along its path as above described, a book cover is being automatically fed so as to occupy flat open position above the back gripper and in proper position to receive the unbound book preparatory to securing the cover thereto. These covers are fed from a stack of the same which is arranged and replenished from time to time by the attendant at the end of the machine opposite to the end where the unbound book is placed in the machine in the first instance.

The book covers rest in a stack upon the cover guides 73ª and also upon the rails 74, along which slide the fingers 74ª for engaging and advancing a single cover at a time from the bottom of the stack. The covers are maintained in a stack by means of the vertical rods or wires which are secured in the adjustable holders 75. These holders can be loosened and slid along the horizontal rods 76 and set in position by means of set screws 77. The guide wires 78 are positioned in front and to the rear of the stack of covers, and the lower ends of the front wires terminate above the bottom of the pile or stack of covers so as to permit them to be fed from the bottom thereof. The side wires 79 extend to the very bottom of the stack so as to maintain them all in vertical registry. The front and side wires at the corners are, in each instance, mounted in the same bracket. The cross rods 76 are adjustable along the longitudinally extending rods, 73, according to the size of book covers. Immediately in front of the stack of covers there are provided vertically disposed strips 82 mounted on the same brackets with rods 78, the purpose of these strips being to prevent more than one cover being fed from the stack at one time. Accordingly, the lower ends of strips 82 are at a level corresponding approximately with the upper surface of the lower-most cover (see Fig. 22). The brackets in which strips 82 are mounted carry also spring fingers 83 of the form illustrated in the drawing, (Figs. 22 and 28), to serve as a means of guiding the lower-most cover along the tracks as it leaves the stack. The strips 82 are adjustable in their brackets, and graduations may be provided to indicate different heights corresponding to different thicknesses of covers.

As above stated, the means for feeding the covers from the stack comprises fingers 74ª secured to the upper sides of the racks 74, the lower sides of which are engaged by the pinions 85 for reciprocating movement thereof. The pinions 85 are in turn operated by pinion 87 which meshes with the rocking segmental gear 88. This gear segment 88, pivoted on axis 90, carries roller 92 for actuation by the closed cam slot 93 in the disk 94. This cam disk is mounted upon the shaft 95 which is operated through the train of gears and shaft connections shown in the drawing; and in the proper time relation with respect to the other mechanisms herein referred to and according to the manner of operation herein described. Thus the covers are fed, one at a time, to occupy position directly above the gripper in flat open position to receive the unbound book. The back of the cover, in this position, still rests upon the cover guides 73ª.

During movement of a cover to the position just referred to, there is supplied to the middle of the cover a combined strip of "super" and paper comprising a piece of gauze stuck to a narrow strip of paper, to be applied between the cover and the back of the book. That is, the "super" and paper are properly positioned upon the cover so as to be fed along with the cover and applied as a reinforcing means between the book and cover at the back and the side portions immediately adjoining the back. A roll of gauze, or "super", is mounted upon the reel 96 and a roll of gummed paper is carried by the reel 97, both of which are removably mounted in the upright frame. The gummed side of the paper strip passes over the moistening roll 100 which is mounted in the liquid container 101. The gauze or "super" and paper are then fed together between feed rollers 102, the pressure of which causes the gauze and paper to stick together. Thence the "super" and paper pass through the chute or guide 103 to the knife 104, below which it passes to be cut into predetermined lengths. The feed rolls 102 are operated through the gears and pinions 105, 106, 107, 108 and 109, the last named pinion being operated by rack 110, which has an adjustable connection at its upper end with its operating means. The upper end of the rack 110 is pivotally connected to the arm or bar 111 which has its other end secured to the block 112. This block is adjustable along the diametrically extending slot 113 in the disk 114 by means of the screw 115 which is connected at its one end to the block 112 and has threaded engagement at its other end with the web portion 114ª. The disk 114 is secured to its operating gear 116 by means of screws 117, and the gear 116 is driven by the gear 116 on shaft 119. This shaft is driven from the main drive shaft of the machine. Thus the length of throw of the rack can be varied and hence the length of "super" and paper can be accordingly varied.

The knife blade 104 is normally forced downwardly by spring 120 and is raised by action of cam 121 upon the rods 121ª which actuate rack arms 104ª to raise the blade. The cams 121 are carried by shaft 116ª upon which the disk 114 is also mounted.

The means for feeding the "super" and paper will now be described. The cover-feeding racks 74 are provided with projections 122 which extend between adjustable plates 123 carried by the slidably mounted bars 124, this adjustment comprising the screw and slot connections shown in the drawings. The projections 122 extend between the plates 123 so as to be engaged thereby in the manner to be explained. The other end of bar 124, in each instance, has pivotal connection with the lower end of the upright member 125. The member 125 in each instance has fixedly mounted in its upper end the transversely extending shaft 126 upon which the member is locked by the set screw 126ª engaging a flattened portion of the shaft. The other end of the shaft 126 in each instance, is mounted in the bearing 127 on the side of the block 128 which is slidably mounted upon the squared bar 129. This bar 129 in each instance, is mounted at its two ends in the frame structure and supports at its one end the guide chute 130 through which the "super" and paper are fed immediately after passing under the cutting knife and just prior to being severed thereby. A coil spring 131 surrounds each shaft 126 and has one end secured to the collar 126ᵇ fixed upon the shaft 126, while its other end is anchored to the bearing 127. The flat finger 132 extends along the under side of block 128 and has an angular extension near its rear end, this extension being fixedly mounted upon the inner end of shaft 126 so as to be moved therewith. The normal tendency of spring 131 is to hold the finger 132 up against the block 128. The fibre block or shoe 134 which is carried by the spring strip 135, secured to the block 128, extends therethrough and has frictional engagement with the bar 129. The purpose of the spring fingers 132 is to engage the advanced end of the "super" and paper at the proper time so as to hold the same in engagement with the book cover which is being fed into the machine, and to permit the cover and "super" and "paper" to be fed together into position for receiving the book. There is a certain definite time relation between the movement of the cover and the feeding of the "super" and paper to position under the finger 132 and the clamping engagement of said finger. To explain, let us suppose that the racks 74 have started to move a cover towards the center of the machine. This movement of the racks 74 does not immediately actuate the flat finger 132;—not until shortly after projection 122 is engaged by one of plates 123. The frictional engagement of shoe 134 affords sufficient drag to prevent the block from starting to move until finger 132 has first been moved down into effective engaging position. The parts are so constructed and arranged and their operation so timed with respect to each other that the finger 132 is forced down to engage the forward end of the "super" and paper as soon as the forward end of the cover is in position beneath the same. This operation takes place, of course, as the rack bar 74 is moved towards the right, as viewed in Fig. 36, and the block 128 is then moved along the bar 129 so as to advance the cover and "super" and paper. Then, upon reverse movement of the rack bar 74, it will be seen that the plate 123 moves away from projection 122 and at once the coil spring 131 is free to exert its normal influence upon the finger 132 and to cause the same to rise to idle position against the block preparatory to the reverse movement of the block to its original position to permit another cover and port of "super" and paper to pass into position thereunder. It is to be understood that the "super" and paper is not cut off until it comes to occupy the position just referred to. The glue on the back of the book will cause the "super" and paper to adhere to the back and the extended parts of the "super" will stick to the sides of the book because of the paste already applied to the book. Thus, the "super" and paper are fed together with the cover to proper position above the back-gripper and below the unbound book to receive the same.

The back-gripper mechanism comprises the base portion 136 which is adapted to be raised and lowered in a suitable track-way in the frame by means of the depending arms 137 which have pivotal connection to the rock arm 138. The arm 138 is rockably mounted on axis 139 and has a roller on its other end for engagement in the slot 140 of the closed cam provided on the face of disk 141. The cam disk 141 is mounted on shaft 23 for operation thereby. Upon the base portion are slidably mounted the jaw members 144 between which the back portion of the book and cover are gripped. This slidable mounting is indicated at 144ª. A means of adjustment is provided so as to adapt the space between the jaw members for books of different thicknesses. The top plates of the jaw members are provided with slots 145 which together with set screws permit movement of the jaw members so as to allow the jaw members to pass around the back of the book and at the same time to form the cover thereabout. Springs 144ᵇ normally force the jaw members inwardly. These jaw members can be adjusted as a unit by means of the oppositely threaded screws 146, 147 which extend through ears 148 provided upon the jaw members and which can be adjusted by means of the squared shaft 149 operatively connected therewith through the bevel gears shown on the drawing. The inner ends of screws 146, 147 have a feathered connection with the blocks 150 so as to turn therewith and also permit slidable adjustment. Immediately below and engaging the under faces of the plates of the jaw members, there is provided a bottom plate 151 which is normally forced up against the jaw members by the leaf springs 152 secured to the underside thereof and engaging at their free ends upon the base portion. The bolts 153 secured to the underside of the bottom plate 150 serve as a means of varying the upper-most position of the bottom plate, the nuts 153ª engaging a part of the base portion so as to serve as a stop therefor. The jaw members are automatically moved towards and from each other during the up and down movement of the same with the base portion, this lateral movement being effected by engagement of the rollers, carried by the jaw members, in the cam grooves 154 provided in the stationary frame. These cam slots are so designed and the operations of the parts are so timed that the jaw members are open to receive the book as it is deposited by the upper-gripper in its downward movement; the jaw members are then automatically closed upon the cover and book which have in the meantime been brought into proper registry with each other. The cover and book, upon being engaged by the back gripper, are caused to depress the bottom plate 151 against the tension of the leaf springs bearing against the under-side thereof.

As soon as the book and cover are gripped by the jaw members, this gripper automatically descends and carries the book and cover downwardly, the cover being partly closed about the book because of the gripping action of the jaw members on the cover and book together, but only partly closed. As this downward movement begins, the inclined sides of the cover are engaged by the inwardly and laterally extending pins 155 which have already started automatically to move inwardly from the opposite sides of the machine in a predetermined time relation. These pins extend through the presser-blocks referred to below. The purpose of these pins is to maintain the sides of the cover in proper upright position and to initiate the closing of the cover about the book and to maintain such position until pressure is applied for securing the cover to the book, and also to maintain the bound book in proper position to be gripped by the finished book gripper. These pins are normally forced inwardly by spring 156 connecting the rock arms 157 to which the outer ends of the pins are pivotally connected. The rock arms 157 are mounted on axes 158 and are actuated by means of the rollers 160 which are carried thereby and actuated by the open cams 161. The cams 161 are operated on shafts 162 which in turn are operated through the train of connections illustrated on the drawing.

Pressure for closing the cover about the book and for causing the same to effectively adhere together is applied by pressure blocks 163 on the inner ends of horizontally extending rods 164, which rods are adjustable in length by means of turnbuckles 165. The rods 164 and hence the pressure blocks operated in each case by means of the arm 166 pivotally connected to the rod 164 and carrying roller 168 engaging the closed cam slot 169 in the cam disk 170. These cams are mounted upon shafts 162 and are operated thereby. The operations of the pins 155 and presser block 163 are so timed with respect to each other, as well as the other mechanisms, that the pins engage the sides of the cover prior to engagement by the presser blocks, and such engagement of the pins continues even after release and withdrawal of the presser blocks from the book and cover. The bound book is now ready to be discharged from the machine. Accordingly, the finished book gripper mechanism is automatically set into operation to grip the bound book as soon as presser blocks 163 recede and to discharge the same in the path of a delivery chute. The pins 155 remain in engagement with the sides of the bound book until it has been engaged by the finished book gripper. Then the pins automatically recede and the book is carried away to be discharged.

Upon the reciprocatable block 172 there are pivotally mounted the arms 173 which carry at their free ends the pivotally mounted gripping members 174 for gripping the sides of the bound book. The spring 175 tends to normally force these gripping members towards engaging position or, in other words, to close the same. The other ends of the arms 173 make an angle with the main part thereof in each case, and are connected by means of the toggle links 176. Block 172 is carried by the one end of rack bar 178 which is adapted for horizontal reciprocating movement. The pivotal connection 179 is joined to the one end of the cylindrical rod 180 which has slide engagement through the ears 180ª on the rack bar 178. The other end of rod 180 is jointed at the point 181 by a horizontal pivotal connection to the one end of the squared bar 182 which extends along the upper side of the rack bar and which has its free end adapted for locking engagement against shoulder 183 on the rack bar. The bar 182 has mounted thereon the roller 184 which is adapted to engage the upper side of the cam 185 which is provided upon the stationary frame 186 through which the rack bar reciprocates. Such engagement of the roller with the cam 185 serves to trip the bar 182 so as to release the same to the action of the spring 175 which then closes the arms 173. The closing movement of the arms 173 is, of course, limited by the engagement of the members 174 together or by their engagement with a book therebetween. This is the action that takes place upon moving the rack bar to the right, as viewed in Figs. 37 and 38. Then, upon moving the rack bar to the left, the roller 184 is caused to engage the inclined shoulder 187 and to ride under the ledge 188. Engagement of the roller with this shoulder causes a slowing up of the movement of the bar 182 with respect to the continued uniform rate of movement of the rack bar. In other words, there is created a relative movement between the bar 182 and the rack bar, and consequently between the pivot point 179 and the block 172 on which the arms 173 are mounted. As a result, there is caused a momentary opening movement of the arms 173. This movement is sufficient for the shoulder or stop to pass beneath and just beyond the end of bar 182 so as to be again engaged thereby. The actual locking engagement between this bar and the shoulder is facilitated by the passage of roller 184 under the ledge 188, such lowering movement of the roller urging the end of bar 182 downwardly so as to snap into such locking engagement as soon as the shoulder 183 is in proper position. The cam or wedge member 187—188 is adjustable by means of the screw bolt and slot arrangement, shown in Fig. 37, as a means of establishing or restoring proper time relation of the operation of this particular mechanism with respect to the other parts of the machine. The rack 178 is actuated by pinion 189 which has companion pinion 190 on its shaft for operation by segmental gear 191. This gear segment is mounted on axis 90 which carries also the other companion arm 192 on the free end of which there is provided the roller 195 engaging in the closed cam groove 196. The cam plate 197 is mounted upon the shaft 95 and is operated thereby.

The horizontally and transversely extending chute, into the path of which the bound books are delivered by the finished book gripper just described, is indicated in a general way by reference numeral 199. As each book is deposited, a metal plate 200 of the particular design shown in the drawing, is automatically fed into position so as to be in close contact with the books. These plates are automatically fed from a horizontally extending magazine which is indicated in a general way by reference numeral 201 and which will be described below in detail. The forward plate is automatically fed transversely of the magazine along the track or guideway 203 into position just back of the bound book immediately upon its being delivered by the finished book gripper. The plates are engaged by cut-out portion 204ª of finger 204 which extends from and is operated by the same horizontally reciprocatable rack as operates the finished book gripper. These plates are notched on their end edges as at 200ª so as to engage corresponding ribs 199ª along the side of the delivery chute. Each plate, as it is fed to proper position, as just referred to, is advanced and held against the last book deposited in the delivery chute by means of the plate holder and carrier 213. The plate holder and carrier 213 is given a properly timed reciprocating movement by means of the cam 214 which operates rock arm 215 connected to a horizontal rod on the rear face of plate holder and carrier, (see Fig. 1), and serves to advance the books also along the chute. The cam 214 is mounted upon and is operated by shaft 216 which is driven by the main operating mechanism through the connections as illustrated in the drawing. The horizontal rod, just referred to, has a guide bracket 215ª through which it extends.

More detailed reference will now be made to the plate magazine 201. The front end of the magazine has a depending lip 217 against which the fore-most plate engages. The rear-most plate in the magazine is engaged by the squared ends of the beveled latches 218 which are normally held inwardly by the leaf springs 219 supported on the side arms 220. These side arms are mounted upon the movable bracket or frame 221. The rack 222 on the bracket 221 is operated by pinion 223 so as to move the bracket. This pinion has a lever 224 and is adapted to roll along the slots 225 in the side walls of the bracket. The rack 226 is provided in parallel relation with rack 222 and is engaged by the same pinion 223. The rack 226 extends through the bracket 221 and supports the lip or chute 227, in front of which the plates are supplied by the attendant, the plates being placed upon the stationary bottom support 228 with which the bracket 221 has sliding engagement, as indicated in the drawing. The cable 229 has one end connected to the bracket 221 and its other end to the large part 230 of a pulley; while cable 231 is connected at its one end to the small part 232 of the pulley and at its other end to the coil spring 233 which is anchored to a fixed part 233ª of the frame.

Whenever made necessary by the insertion of plates in front of chute 227, the upper rack will move to the right, the pinion 223 rolling in the slots 225. Then, upon raising lever 224 through ninety degrees, the lower rack 222 with its bracket is moved towards the right, as viewed in Fig. 48, and the arms 220 are likewise moved in the same direction, the beveled faces of the latches 218 slipping past the edges of the plates. The plates are thus held up against the chute 227 with more or less pressure and the upper rack 226 does not move during this manipulation. Then the lever, having been raised through ninety degrees, is released and falls by gravity and also by the force of the spring 233 so as to occupy horizontal position.

The rotation of the pinion, incident to such return movement of the lever, causes the upper and lower racks to move together towards the left, the pinion moving in the same direction. As the plates are taken from the front end of the supply, by the automatic mechanism already referred to, the action of the spring 233 will cause the bracket to automatically follow the supply of the plates so as to maintain the same in proper position to be fed from the supply magazine.

The forward edge of each plate 200, as it is fed transversely into the delivery chute, is caused to strike the cam or inclined shoulder 234 of the latch 235 carried by the plate holder and carrier 213 so as to cause the same to recede sufficiently to permit the plate to pass. These latches 235 are pivotally mounted at one end on the rear side of the plate holder and carrier and are normally held in closed position by springs 235$^a$. At the other end of the plate holder and carrier there are provided the top and bottom duplicate catches 236 which have their inner faces inclined, as at 236$^a$, so as to engage in the notches 200$^a$ of the forward end of the plate 200 and cause the same to assume position against the plate holder and carrier see Figs. 51 and 52. These catches 236 are capable of straight line movement with the plate 200 upon being engaged thereby and against the tension of the springs 237. In this way, the rear end of the plate 200 is permitted to pass the catches 235 and to become engaged thereby in the notches 200$^a$, whereupon the forward catches 236 return to normal position, under the influence of springs 237, and the plate is held in proper position to be fed forwardly against the book, upon being deposited in the delivery chute.

The plate 200 is released from the plate holder and carrier by engagement and opening of the latches 235 and catches 236 by the ends of fixed rods 238, this operation taking place when the presser plate has moved forwardly a predetermined distance. At the same time, the forward movement of the plate holder and carrier causes the end edges of the plate 200 to engage the beveled corners of the spring latches 239 so as to permit the plate 200 to pass the same and be held thereby. The rods 238 and latches 239 are mounted upon the frame structure of the delivery chute. A bumper or stop 240 is also provided to limit the transverse movement of a plate 200 and to thereby facilitate proper engagement of the plate by the plate holder and carrier.

From the delivery chute the books and plates, in their alternate arrangement, are slid by hand on to the receiving rack 241 which is adapted to occupy horizontally disposed position with its receiving surface 241$^a$ substantially flush with or slightly below the level of the bottom of the delivery chute. This rack is pivotally mounted upon bracket arms 242 extending from the supporting base 243 of the press and forms part of the book bundling mechanism.

The bottom 241$^a$ of the rack is supported by an adjustable bracket 245 which is secured to the under side of the bottom 241$^a$ and has upwardly extending end portions 246 which cooperate with screws in the side rails 249 for adjusting and setting the bottom by means of wing nuts so as to occupy the proper elevation according to the thickness of the particular books at a given time. The plates 200 rest in the cut-out seats provided along the inner edges of rails 249. It is understood, of course, that the degree of curvature of the back edge portion of the bound book varies according to the thickness of the book, and hence the elevation of the books must be regulated so as to be in proper position with respect to the ribs 200$^b$ on the plates. The rods 250, which are mounted at the bottom and at the sides of the rack, serve as supports for the oppositely disposed rock arms 251, the upper ends of which carry the bars 252 for engagement in the grooves or cut-out portions 200$^a$ of the plates. This serves to insure uniform alignment of all the plates and to hold the books and plates when swung up to the press. Hence the ribs of the plates will engage all the books at the same corresponding and proper point, which is established by the adjustment of the bottom 241$^a$ in the manner above set forth. As a means of manipulating the rock arms 251, I have provided the lower extensions 251$^a$ thereof with pins 253 which are adapted for engagement by the cams 254. These cams are carried and operated by the transversely extending rock shaft 255 which is mounted so as to extend below the rack and which is actuated by means of handles 256.

When the books have been placed in the rack in the manner above set forth, the rack is turned with its contents so as to occupy upright position and to deposit the books in a stack upon the press which is supported upon the base 243. This is accomplished by releasing the bars 252 which alone support the books in such upright position. The bottom 257 of the press has an annular foot portion 257$^a$ which is rotatably mounted upon an inwardly extending annular flange at the upper end of the base and has a peripheral flange above which is secured the annular ring 257$^b$ so as to maintain the parts in such relation. The upwardly extending rods 258 serve to support the head 259 of the press. The plate 260 is adapted to rest upon the bottom 257 and a duplicate plate 261 is adapted to occupy position above, these two plates being flanged and arranged reversely with respect to each other. The rods 262 extend through the ends of these two plates and are provided with nuts 263 at their lower headed ends and wing nuts 264 on their upper ends so as to permit pressure to be applied to the stacks of books and to hold the same together after the pressing operation. The rack and press are so constructed and arranged that, upon turning the rack to upright position, the stack of books thereon is deposited upon the one side of the plate 260. Then, upon rotating the press through 180°, it is in position to receive another stack of books from the rack which, in the meantime, has been re-filled. With the two stacks of books resting on plate 260, the two oppositely disposed sets of bars 258$^a$ are caused to engage in the corresponding slots 200$^a$ so as to preserve the same relative arrangement of plates and books that was established by the bars 252. The bars 258$^a$ have pin and slot engagement 258$^b$—258$^c$ with the angular ends of the cross bars 258$^d$ which are carried by the rods 258. Vertical movement of the bars 258$^a$ will cause the same to move inwardly or outwardly, as may be necessary for engagement or disengagement of the bars 258$^a$, the slots 258$^c$ being inclined, as indicated in Figs. 59 and 60 of the drawing, so as to permit such operation. These bars are manipulated by means of the handles 265 which are connected by the link and lever combination indicated in a general way by reference numeral 265$^a$. The handles are provided with eccentrically mounted pins 285$^d$ which engage slots 285$^e$ in the upper ends of the bars 258$^a$ so as to cooperate with pins and slots 258$^b$—258$^c$ in actuation of the bars. With this arrangement it can be operated from either side and the opposite sets of bars can be operated simultaneously. This operating means is mounted upon the head 259. After effecting engagement of the bars with the two stacks of books, the rods 262 and top plate 261 are placed in position, the lower ends of rods 262 having removable engagement in the slots 260$^a$.

When the two stacks of books have been placed in the press, pressure is applied to the underside of the stacks of books by means of a mechanism to be now described. The under-side of the bottom plate 260 is adapted to be engaged by the upper end of the rack 266 which is operated by the pinion 267 and which has an oblong head portion 266$^a$ which is adapted to extend freely up through a correspondingly shaped opening 257' in the bottom 257. The press is rotated when the rack is in lowered position and the head 266$^a$ is freely rotatable on the rounded end of the rack so as to permit the operation just described. This pinion and the ratchet wheel 268 are fixed upon the same shaft 269, and freely mounted upon the same shaft is the lever or treadle 270 which carries the pawl for operation of the ratchet. The spring 272 tends to hold the pawl in engagement with the ratchet wheel, and the pawl 273 serves to lock the ratchet in set position. Depending from the lever arm 270 is a link 274, the other end of which has pivotal connection with the rock arm 275. The other end of this rock arm engages under the lower end of the rack 266, so as to assist in raising the rack upon depression of lever arm 270, as will be readily understood from the drawing. The spring 276 normally tends to hold lever arm 270 in raised position, the upper end of this spring being anchored to the base. I have provided also a brake band 277 around the hub 278 which is fixedly mounted upon the shaft 269 with the ratchet and pinion. The one end of the brake band is anchored to a bracket on the base and the other end thereof is connected to the shaft 279 which is suitably mounted on the base so as to be rotated by the lever 280 secured thereto. The purpose of the brake is to prevent to rapid release and lowering of the rack under the influence of the spring 276 as well as gravity. Thus the brake is applied during the releasing operation so as to prevent the rack from lowering too suddenly upon release of pressure. In order to release and lower the rack, the lever arm 270 is depressed so as to momentarily disengage the locking pawl 273, the period of such disengagement being of sufficient duration to permit backward rotation of the ratchet before the pawl 273 returns to locking engagement.

When pressure has been applied to the bottom of the stacks of books in the manner just now described, the rods 262 are placed in position and the wing nuts 264 are tightened and the books are ready to be removed while still in such state of pressure between the upper and lower plates. The bars 258$^a$ are disengaged so as to permit such removal. The upper and lower plates together with the rods therethrough might be considered a basket, and another so-called basket in empty condition is then placed in the press to receive another supply of books from the rack. Any number of such baskets may be provided.

Thus, the engagement of the ribs 200$^b$ of the plates 200 with the books under pressure and in the manner above described, serves to form grooves or hinge joints between the back and the adjacent portions of the cover of each book. This engagement also ensures sticking of the cover to the fly-leaf of the book at this point. The ribs 200$^b$ are provided at top and bottom and on each face, and duplicate cut-out portions 200$^a$ are also provided on both ends of the plate and at the same corresponding points. Thus, these plates are reversible.

To recapitulate, the operation, briefly stated, is as follows: The unbound book is carried by the first book gripper from one end of the machine while a cover and "super" and paper, glued together, are advanced from the other end of the machine. The book is received by the top-book gripper, has paste automatically applied thereto, and is deposited upon the "super" and paper and cover which have in the meantime assumed proper position upon the cover guides. The back gripper then grips the book and cover and ascends, the sides of the cover being engaged by the transversely, oppositely and inwardly extending cover-holder pins. The cover is then closed upon the book by the presser blocks so as to be secured thereto. The presser blocks then recede and the bound book is engaged by the finished book-gripper and carried in its reverse or backwards movement to the one end of the discharge chute and is here deposited in front of plate 213 which pushes the book along the delivery chute. The movement of the finished book-gripper has served also to bring a metal plate to position in the path of the delivery chute so as to be received by the plate holder 213 in the manner above explained. Thus an alternating succession of bound books and plates are fed along and delivered from the chute and are transferred onto the rack for further transfer onto the press. The application of pressure to a stack of books and plates serves to form the hinge joints between the back and sides of the cover and to press the book as the last step.

The numerous advantages resulting from this machine and the manner of procedure herein outlined will be apparent. The glue is applied automatically to the back of the book in an effective manner by a highly efficient form of brush; the "super" and paper are automatically measured, cut and secured together in a single operation and is applied as a unit to the cover and book; the cover is automatically shaped about the back of the book so as to fit snugly thereabout; and the plates are automatically alternated with the bound books and arranged therebetween in such manner as to ensure the formation of the hinge joints at the proper points and to prepare the backs for the application of pressure, this particular manner of forming the hinge joints being applicable to books of various sizes. Thus I have devised an automatic, unitary machine structure which is capable of performing all of these operations with increased quality and quantity production.

What I claim as new is:

1. In a book-binding machine the combination of means for automatically conveying a book with back down and a stiff cover therefor to a given point in the machine structure, means for applying an adhesive to the sides of the book, means adapted to automatically engage the under side of the back part of the cover and to support the back of the book thereon, and means for there automatically securing the same together.

2. In a book-binding machine, the combination of means for automatically conveying a book with back down and a stiff cover therefor from different directions to a given point in the machine structure, means for applying an adhesive to the sides of the book, means for supporting the book and cover in proper position for the binding operation, and auxiliary means for there automatically securing the same together.

3. In a book-binding machine the combination of means for automatically conveying a book and a cover therefor to a given point in the machine structure, means for applying an adhesive to the sides of the book to secure the book and cover together, means for automatically impregnating the back of the book with the adhesive, and means for automatically securing the book and cover together.

4. In a book-binding machine, the combination of means for automatically conveying a book and cover therefor to a given point in the machine structure, means for applying an adhesive to the sides of the book to secure the book and cover together and for impregnating the back of the book with the adhesive, and means for automatically securing the book and cover together.

5. In a book-binding machine, the combination of first gripping means, means for gripping the top of a book, and means for gripping the back portions of the book and cover therefor, said several means being so constructed and arranged that said top-gripping means is adapted to receive the book from said first gripping means and to deliver the same in proper registering position on a cover above said back-gripping means preparatory to securing the book and cover together, automatic means for operating said several gripping means in the aforesaid manner, and automatic means for securing the book and cover together.

6. In a book-binding machine, the combination of first gripping means, means for gripping the top of a book, and means for gripping the back portions of the book and cover therefor, said several means being so constructed and arranged that said top-gripping means is adapted to receive the book from said first gripping means and to deliver the same in proper registering position on a cover above said back gripping means preparatory to securing the book and cover together, means for automatically feeding covers so as to occupy position above said back-gripping means, means for operating said several gripping means in the aforesaid manner, and automatic means for securing the book and cover together.

7. In a book-binding machine, the combination of automatic means for conveying a book and a stiff cover therefor to a given point in the machine structure, means for applying an adhesive to the sides of the book, means for automatically supplying a reinforcing means between the cover and the back of the book, and means for automatically securing the book and cover together with the reinforcing means therebetween.

8. In a book-binding machine, the combination of automatic means for conveying a book and stiff cover therefor to a given point in the machine structure, means for applying an adhesive to the sides of the book, means for automatically preparing and supplying a predetermined length of reinforcing means between the cover and back of the book, and automatic means for securing the book and cover together with the reinforcing means therebetween.

9. In a book-binding machine, the combination of automatic means for conveying a book and a stiff cover therefor to a given point in the machine structure, means for applying an adhesive to the sides of the book, automatic means for preparing a reinforcing means, automatic means for conveying said reinforcing means so as to occupy position between the book and cover, and automatic means for securing the book, cover and reinforcing means together.

10. In a book-binding machine, a device for automatically preparing a combination of crash and paper, said device comprising means for automatically feeding the crash and paper separately and securing the same together, and means for automatically severing the combination of crash and paper in predetermined lengths.

11. In a book-binding machine, a device for automatically preparing a combination of crash and paper, said device comprising means for automatically feeding the crash and paper separately and securing the same together, means for automatically severing the combination of crash and paper in predetermined lengths, and means for adjusting said severing means so as to vary the lengths of the crash and paper combination to be cut.

12. In a book-binding machine, the combination of means for automatically conveying a book and stiff cover therefor to a given point in the machine structure so as to be in proper registry for binding, means for applying an adhesive to the sides of the book, means for automatically applying the book and cover together, and means for automatically arranging the bound books together in bundle form for application of pressure thereto.

13. In a book-binding machine, the combination of means for automatically conveying a book to a given point in the machine structure, means for automatically conveying a stiff cover therefor to substantially the same part of the machine structure, means for applying an adhesive to the sides of the book, means for automatically applying the book and cover together, and means for automatically arranging the bound books together in bundle form for application of pressure thereto.

14. In a book-binding machine, the combination of means for automatically conveying a book and a stiff cover therefor to a given position in the machine structure preparatory to securing the same together, preliminary means adapted to engage the sides of the cover as it is engaged about the book so as to ensure proper position of the bound book for withdrawal, means for automatically securing the book and cover together while engaged by said preliminary means, and automatic means for positively engaging the bound book and withdrawing the same.

15. In a book-binding machine, the combination of means for conveying a book and a cover therefor to a given position in the machine structure, auxiliary engaging means, means for securing the book and cover together, finished book gripping means for delivering the bound book, said several means being so constructed and arranged that said auxiliary means is adapted to engage the sides of the cover about the book during the operation of said securing means and to continue in such engagement until the engagement of said finished book gripping means so as to assure proper engagement of said finished book gripping means, and automatic means for operating said several means in proper time relation according to the aforesaid manner.

16. In a book-binding machine, the combination of means for automatically securing a book and cover together, means for positively engaging and withdrawing the bound book in a direction lengthwise thereof for delivery of the same, and automatic means in addition to said other means, for ensuring proper position of the bound book for engagement by said second-named means.

17. In a book-binding machine, the combination of means for securing a book and cover together, means for automatically withdrawing the individual bound books, and means for automatically placing separately pressing members in operative association with the bound books preparatory to the application of pressure thereto.

18. In a book-binding machine, the combination of means for automatically securing a book and cover together, means for automatically withdrawing the bound books, and means for automatically placing pressing members in alternate succession with the books preparatory to the simultaneous pressing of a plurality of the books between the pressing members.

19. In a book-binding machine, the combination of means for automatically securing a book and cover together, means for automatically withdrawing the bound books, and means for automatically placing pressing members in alternate succession with the books preparatory to the simultaneous pressing of a plurality of the books between the pressing members, said pressing members being provided with means for forming creased joints between the back of the cover and the sides thereof.

20. A book-binding machine comprising means for automatically feeding books and covers towards each other for the binding operation, means for automatically applying adhesive material to the books, means for automatically supplying a reinforcing medium to position between the books and covers, means for automatically securing the same together, means for automatically supplying groove-forming plates between the bound books in alternate arrangement, and means for automatically advancing the books and plates for the pressing operation.

21. In a book-binding machine, the combination of means for automatically securing a book and cover together, means for automatically withdrawing the bound books, means for automatically placing pressing members in alternate succession with the books preparatory to the simultaneous pressing of a plurality of the books between the pressing members, and means for maintaining said pressing members in proper position between said books.

22. In a book-binding machine, the combination of means for securing a book and cover together, means for automatically withdrawing the bound books, means for automatically placing individual pressing members in operative association with the bound books preparatory to the application of pressure thereto, and means for automatically advancing the books and pressing members together.

23. In a book-binding machine, the combination of means for automatically securing a book and cover together, means for automatically delivering the bound books to a chute, means for automatically supplying pressing members to said chute, and means adapted to receive said pressing members and to advance the same with the books along said chute.

24. In a book-binding machine, the combination of means for automatically securing a book and cover together, means for automatically delivering the bound books to a chute, means for automatically supplying pressing members to said chute, means adapted to receive said pressing members and to advance the same with the books along said chute, and means for ensuring proper engagement of said pressing members by said receiving means.

25. In a book-binding machine, the combination of means for automatically securing a book and cover together, means for automatically delivering the bound books to a chute, means for automatically supplying pressing members to said chute and in alternate succession with the books, and interengaging guide means on said pressing members and in said chute for maintaining said pressing members in proper position for advance movement of the books and pressing members together along said chute.

26. In a device of the class described, a presser member having a rib along the entire one edge portion of one face thereof, said rib being adapted to form a creased joint between the back of the cover and the side thereof, and said member being provided also with means on the ends thereof for guiding the same along a chute.

27. In a device of the class described, a presser member having a rib along one edge portion of each face thereof, said rib being adapted to form a creased joint between the back of the cover and the side thereof, in each case, and the said member being also provided with means for guiding the same along a chute.

28. In a device of the class described, a reversible presser member having ribs along the edge portions of the opposite faces thereof, the oppositely disposed ribs in each case being adapted to form a creased joint between the back of the cover and the side thereof.

29. In a book-binding machine, the combination of means for automatically securing a succession of books and covers together, means for automatically arranging groove-forming members between the bound books and along the portions of the sides of the covers immediately adjacent the back thereof, and means for obtaining proper relative arrangement of the grove-forming members and the books preparatory to the pressing operation.

30. In a book-binding machine, the combination of means for automatically securing a succession of books and covers together, means for automatically arranging groove-forming members between the bound books and along the portions of the sides of the covers immediately adjacent the back thereof, means for obtaining proper relative arrangement of the groove-forming members and the books for the pressing operation, and means for applying pressure to the same.

31. In a book-binding machine, the combination of means for holding a plurality of bound books and groove-forming means in alternating arrangement, and means for effecting relative adjustment between the books and groove-forming means so as to obtain proper arrangement of the same preparatory to the impression of hinge joints between the backs and sides of the covers of the books by means of the groove-forming means.

32. In a book-binding machine, the combination of means for holding a series of bound books and groove-forming means in alternating arrangement, means for holding the groove-forming means in predetermined position, and adjustable means for setting the books in proper position with respect to the groove-forming means preparatory to the application of pressure thereto.

33. In a device of the class described, book-bundling apparatus comprising means for receiving a series of alternating books and groove-forming members from a book-binding machine, pressing means, said receiving means being adapted to transfer the books and groove-forming means to said pressing means, and means for ensuring proper arrangement of the books and groove-forming means for the pressing operation.

34. In a device of the class described, book-bundling apparatus comprising means for receiving a series of alternating books and groove-forming members from a book-binding machine, pressing means, said receiving means being adapted to occupy one position for receiving the books and members and another position for transferring the same to the pressing means, means for establishing proper arrangement of the books and members on the receiving means, and means for preserving such proper arrangement during the pressing operation.

35. In a device of the class described, book-bundling apparatus comprising means for holding a series of alternating books and groove-forming members, means for ensuring proper arrangement of the groove-forming members, and means for applying pressure to such series.

36. In a device of the class described, book-bundling apparatus comprising means for holding a series of alternating books and groove-forming members, means adapted to preserve proper arrangement of the groove-forming members during the initiation of the pressing operation, and means for applying pressure to the same.

37. In a device of the class described, book-bundling apparatus comprising means for holding a plurality of series of alternating books and groove-forming members, means for simultaneously ensuring proper arrangement of the groove-forming members in said series for the pressing operation, and means for applying pressure to the same.

38. In a device of the class described, a plate-holding and feeding magazine comprising means for supporting the plates on edge, an abutment for the foremost plate, adjustable pressure means for engaging the rearmost plate and feeding the plates forwardly, adjustable plate-receiving means to the rear of said pressure means, said pressure and receiving means being independently adjustable so as to permit insertion of plates between the same, and means for delivering the plates from the forward end of the magazine.

39. In a device of the class described, a plate-holding and feeding magazine comprising means for supporting the plates on edge, an abutment for the foremost plate, adjustable pressure means for engaging the rearmost plate and feeding the plates forwardly, adjustable plate-receiving means to the rear of said pressure means, said pressure and receiving means being independently adjustable so as to permit insertion of plates between the same, operating means for withdrawing said pressure means, and means whereby said pressure means may be actuated forwardly simultaneously, and means for delivering the plates from the forward end of the magazine.

40. In a device of the class described, a plate-holding and feeding magazine comprising means for supporting the plates on edge, an abutment for the foremost plate, adjustable pressure means for engaging the rearmost plate and feeding the plates forwardly, adjustable plate-receiving means to the rear of said pressure means, said pressure and receiving means being independently adjustable so as to permit insertion of plates between the same, pawl and ratchet mechanism for withdrawing said pressure means, and means including said pawl and ratchet mechanism whereby said pressure means and receiving means may be actuated forwardly simultaneously, and means for delivering the plates from the forward end of the magazine.

41. In a device of the class described, a plate-holding and feeding magazine comprising means for supporting the plates on edge, an abutment for the foremost plate, adjustable pressure means for engaging the rearmost plate and feeding the plates forwardly, adjustable plate-receiving means to the rear of said pressure means, said pressure and receiving means being independently adjustable so as to permit insertion of plates between the same, a ratchet operating means for withdrawing said pressure means, a ratchet operating means for adjusting said receiving means, and a single pawl associated with said ratchets for actuation thereof, and means for delivering the plates from the forward end of the magazine.

42. In a device of the class described, a plate-holding and feeding magazine comprising a frame for supporting the plates on edge, an abutment for the fore-most plate, a pressure means adjustably mounted upon said frame for engaging the rearmost plate and feeding the plates forwardly, plate-receiving means adjustably mounted upon said frame to the rear of said pressure means, said pressure and receiving means having parallel ratchets and a single floating pawl for actuation of said ratchets, whereby said plate-receiving means may be adjusted rearwardly independently of said pressure means, and said receiving means and pressure means may be moved simultaneously in a forward direction, and means for delivering the plates from the forward end of the magazine.

43. In a device of the class described, a plate-holding and feeding magazine comprising a fixed frame for supporting the plates on edge, an abutment for the foremost plate, a pressure means slidably mounted upon said frame, spring means for normally forcing the pressure means forwardly so as to feed the plates, plate-receiving means adjustably mounted upon said frame to the rear of said pressure means so as to receive the plates there-between, said pressure and receiving means having parallel ratchets, and said pressure means having a slotted bearing support, a pinion mounted in said support and having meshing engagement with said ratchet, whereby said plate-receiving means may be adjusted rearwardly independently of said pressure means, and said receiving means and pressure means may be moved simultaneously in a forward direction, and means for delivering the plates from the forward end of the magazine.

44. In a device of the class described, a presser member having a rib along one edge portion of one face thereof, said rib being adapted to form a creased joint between the back of the book cover and the side thereof, and said member having notches in the ends thereof for engagement by co-operating means in positioning the same for the pressing operation.

45. In a bookbinding machine, the combination of means for automatically securing succession of books and covers together, groove-forming plates for arrangement between the bound books and along the portion of the sides of the covers immediately adjacent the back thereof, said plates having notches in the ends thereof, and means adapted for engagement in the said notches for properly positioning said plates between the books.

46. In a device of the class described, book-bundling apparatus comprising means for receiving a series of alternating books and groove-forming members from a bookbinding machine, pressing means, said receiving means being adapted to occupy one position for receiving the books and members and another position for transferring the same, to the pressing means, said groove-forming members having slotted ends, means adapted for engagement in the slots of said groove-forming members for establishing proper registry of the same between the books on said receiving means, and means associated with said pressing means for engagement in the slots of said groove-forming members for preserving such proper registry during the pressing operation.

In testimony whereof I affix my signature.

ALFRED CAHEN.